United States Patent
Ogihara et al.

(10) Patent No.: US 12,199,487 B2
(45) Date of Patent: Jan. 14, 2025

(54) VIBRATION ACTUATOR AND ELECTRIC APPARATUS

(71) Applicants: Yuki Ogihara, Tokyo (JP); Shigeyuki Shimomura, Tokyo (JP); Yoshihiro Maeda, Tokyo (JP); Chikara Sekiguchi, Tokyo (JP)

(72) Inventors: Yuki Ogihara, Tokyo (JP); Shigeyuki Shimomura, Tokyo (JP); Yoshihiro Maeda, Tokyo (JP); Chikara Sekiguchi, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 226 days.

(21) Appl. No.: 17/852,425

(22) Filed: Jun. 29, 2022

(65) Prior Publication Data

US 2023/0006527 A1 Jan. 5, 2023

(30) Foreign Application Priority Data

Jun. 30, 2021 (JP) .................. 2021-109252

(51) Int. Cl.
*H02K 5/04* (2006.01)
*H02K 33/18* (2006.01)

(52) U.S. Cl.
CPC ............. *H02K 33/18* (2013.01); *H02K 5/04* (2013.01)

(58) Field of Classification Search
CPC .......... H02K 33/02; H02K 5/04; H02K 33/18; B06B 1/045
See application file for complete search history.

(56) References Cited

U.S. PATENT DOCUMENTS

2012/0169146 A1* 7/2012 Choi ................. H02K 33/16
310/15

FOREIGN PATENT DOCUMENTS

| EP | 3745568 | | 12/2020 | |
|---|---|---|---|---|
| EP | 3745568 A1 | * | 12/2020 | ............... G08B 6/00 |
| JP | 3748637 | | 2/2006 | |
| JP | 2019-068569 | | 4/2019 | |
| JP | 2019068569 A | * | 4/2019 | |

OTHER PUBLICATIONS

JP-2019068569-A machine translation Apr. 5, 2024.*
European Search Report and the European Search Opinion Dated Nov. 16, 2022 From the European Patent Office Re. Application No. EP22181790. (9 Pages).
European Search Report and the European Search Opinion Dated Nov. 16, 2022 From the European Patent Office Re. Application No. EP22181790.1 (9 Pages).

* cited by examiner

Primary Examiner — Leda T Pham

(57) ABSTRACT

A fixing body configured to house a movable body including a magnet, and including a coil surrounding an outer periphery of the magnet and an outer yoke surrounding an outer periphery of the coil, the fixing body being configured to support the movable body so as to allow the movable body to vibrate back and forth in a vibration direction orthogonal to a radial direction, wherein the outer yoke includes a plurality of openings dispersed in a circumferential direction and provided at the same position in the vibration direction to keep a balance of a magnetic path configured together with the magnet and the coil in the circumferential direction.

7 Claims, 18 Drawing Sheets

VIBRATION ACTUATOR AND ELECTRIC APPARATUS

CROSS REFERENCE TO RELATED APPLICATIONS

This application is entitled to (or claims) the benefit of priority of Japanese Patent Application No. 2021-109252, filed on Jun. 30, 2021, the disclosure of which including the specification, drawings and abstract is incorporated herein by reference in its entirety.

TECHNICAL FIELD

The present invention relates to a vibration actuator and an electric apparatus including the same.

BACKGROUND ART

In the related art, a vibration actuator as a vibration generation source is mounted in electronic apparatuses having vibration functions. By driving the vibration actuator so as to transmit the vibration to the user to make the user feel it, the electronic apparatus can provide stimulation, provide notification of incoming call, and improve sense of operation and realism. The electronic devices are mainly hand-carry electrical devices, including portable game terminals, controllers (gamepads) for stationary game machines, mobile communication terminals such as cell phones and smartphones, and portable information terminals such as tablet PCs. The vibration actuator may also be implemented in wearable devices worn on clothes, arms, etc.

As a vibration actuator with a structure that can be miniaturized and mounted in a mobile apparatus, a vibration actuator used for a pager, for example, is known, as shown in PTL 1.

In this vibration actuator, a pair of plate-shaped elastic bodies are arranged so that they face each other and are each supported by the opening edge of a cylindrical frame. In addition, the vibration actuator has a yoke with a magnet attached to the raised center portion of one of the spiral-shaped plate elastic bodies of the pair of plate elastic bodies, and the yoke is supported within the frame.

The yoke, together with a magnet, constitutes a circular magnetic field generator, and a coil is positioned within the magnetic field of this magnetic field generator with the coil attached to the other plate elastic body. When a current of different frequency is given to the coil through an oscillation circuit in a switched manner, the pair of plate elastic bodies are selectively resonated to generate vibration, and the yoke vibrates in the centerline direction of the frame body within the frame body.

In this vibration actuator, the distance between the magnet and the coil and between the yoke and the coil is larger than the distance between the yoke and the inner circumferential wall of the frame. This prevents the yoke and the magnet from contacting the coil when impacted from the outside, as the yoke strikes the inner circumferential wall of the frame first, thereby preventing damage to the coil.

CITATION LIST

Patent Literature

PTL 1
Japanese Patent Publication No. 3748637

SUMMARY OF INVENTION

Technical Problem

By the way, it is desired that vibration actuators as vibration generators be downsized while maintaining high output, as the products in which they are mounted become smaller and smaller. When a yoke is vibrated inside a frame, as in the case of the configuration of PTL 1, a vibration actuator that prevents the yoke, which is a movable body, from colliding with the frame, which is a fixed body, thereby preventing the generation of mass imbalance in the vibration system and preventing unstable vibration of the movable body, is desired, which is compact and can generate high power.

An object of the present invention is to provide a vibration actuator and an electric apparatus that can generate a suitable vibration output while achieving downsizing.

Solution to Problem

To achieve the above-mentioned object, a vibration actuator of an embodiment of the present invention includes: a movable body including a magnet; and a fixing body configured to house the movable body, and including a coil surrounding an outer periphery of the magnet and an outer yoke surrounding an outer periphery of the coil, the fixing body being configured to support the movable body so as to allow the movable body to vibrate back and forth in a vibration direction orthogonal to a radial direction, wherein the outer yoke includes a plurality of openings dispersed in a circumferential direction and provided at the same position in the vibration direction to keep a balance of a magnetic path configured together with the magnet and the coil in the circumferential direction.

An electric apparatus of an embodiment of the present invention is a hand-carry electric apparatus or a wearable electric apparatus. The vibration actuator is mounted at a contact part for a user.

Advantageous Effects of Invention

According to the present invention, it is possible to generate a suitable vibration output while achieving downsizing.

BRIEF DESCRIPTION OF DRAWINGS

FIG. 21A is a diagram illustrating a vibration state where the movable body is located on the first amplitude position on the top surface side, and FIG. 21B is a diagram illustrating the vibration state where the movable body is located at the second amplitude position on the top surface side;

DESCRIPTION OF EMBODIMENTS

Figure 1:
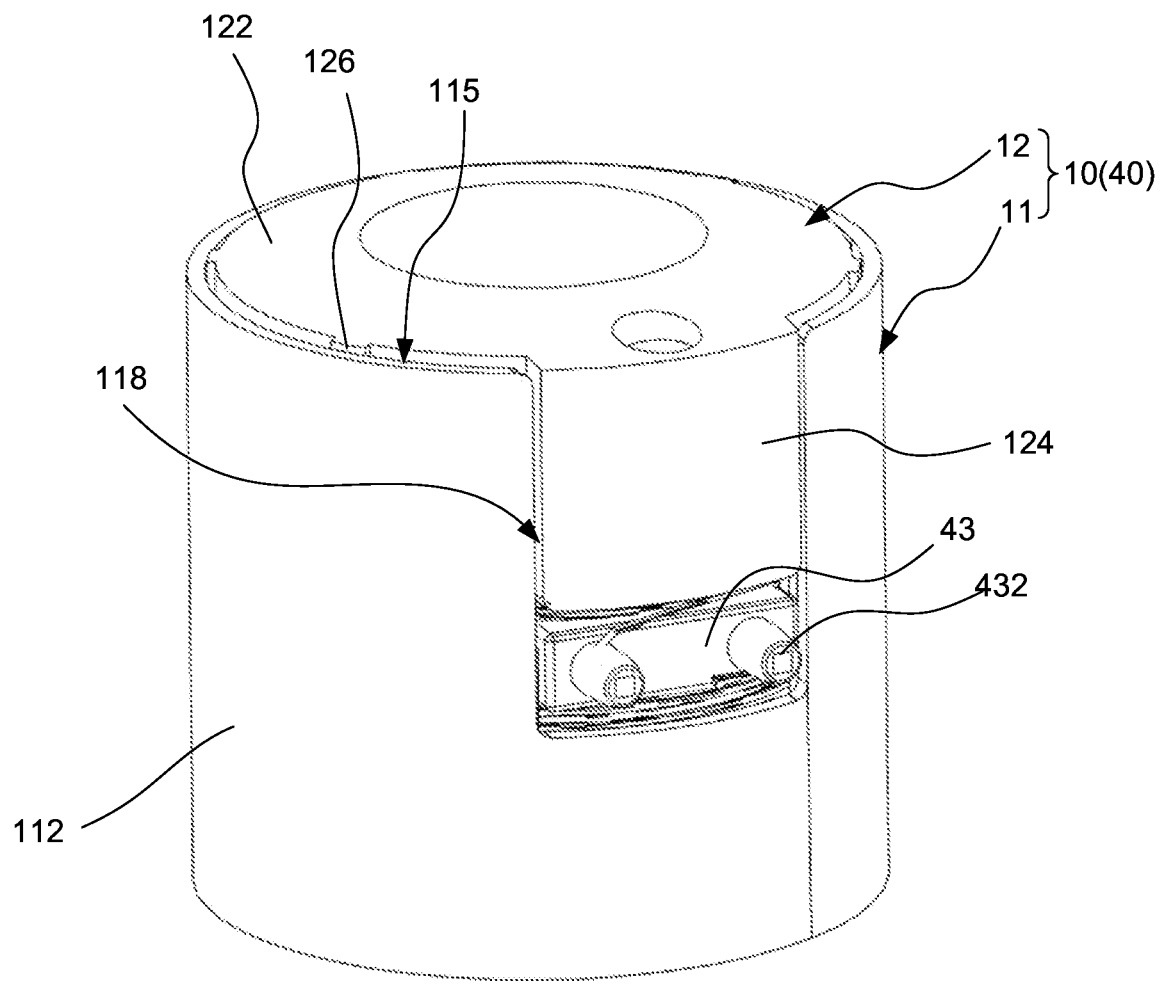
FIG. 1 is a perspective view illustrating an external appearance of a vibration actuator according to an embodiment of the present invention as viewed from the front surface side.
Figure 2:
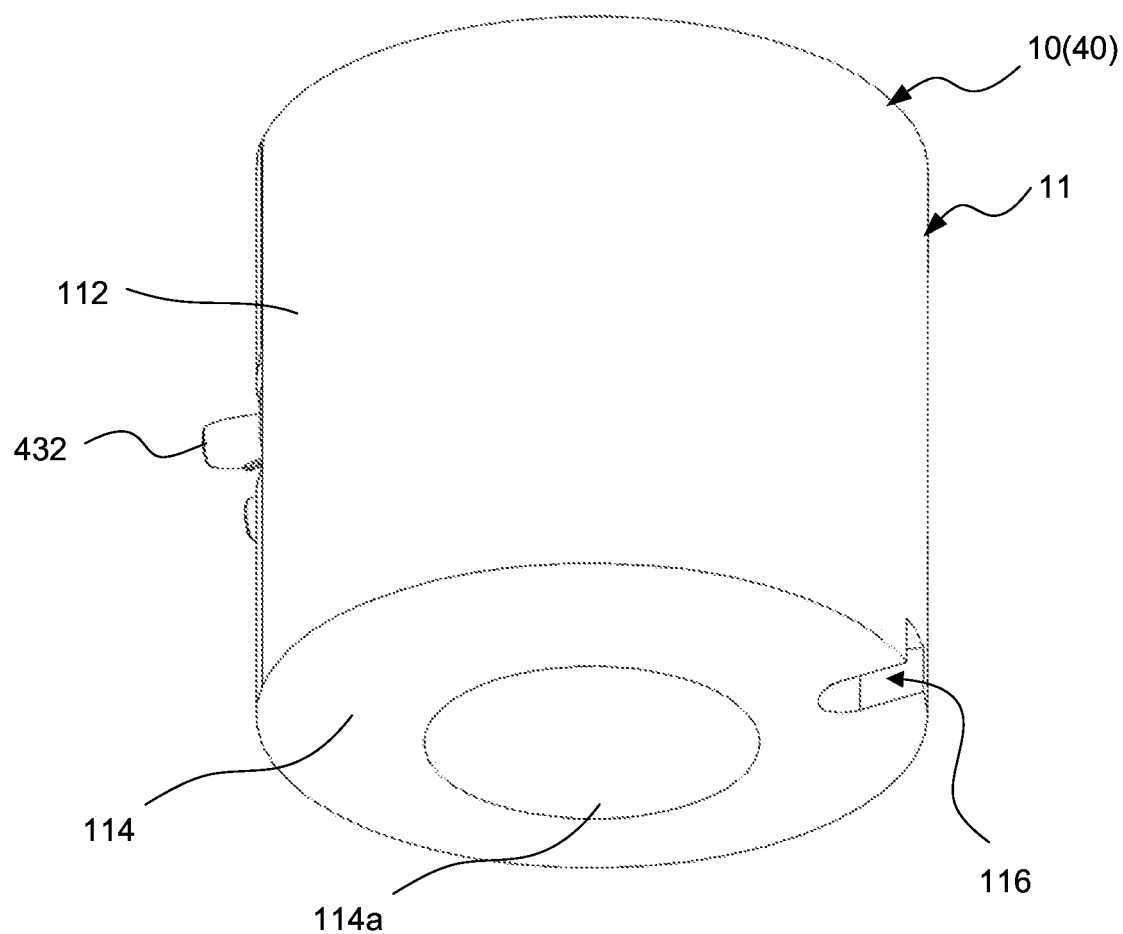
FIG. 2 is a perspective view illustrating an external appearance of the vibration actuator according to the embodiment of the present invention as viewed from the back side.
Figure 3:
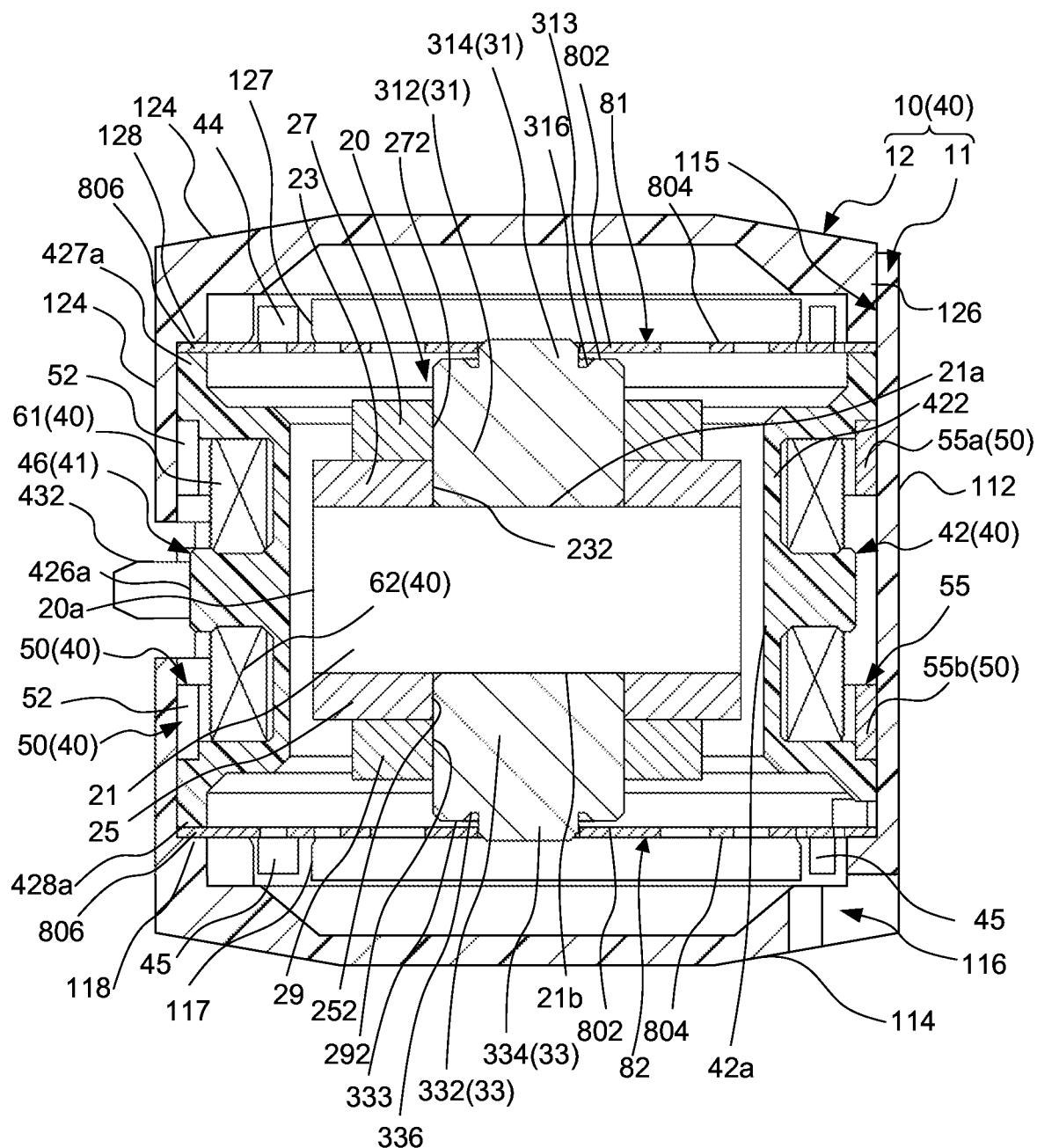
FIG. 3 is a longitudinal sectional view of the vibration actuator.
Figure 4:
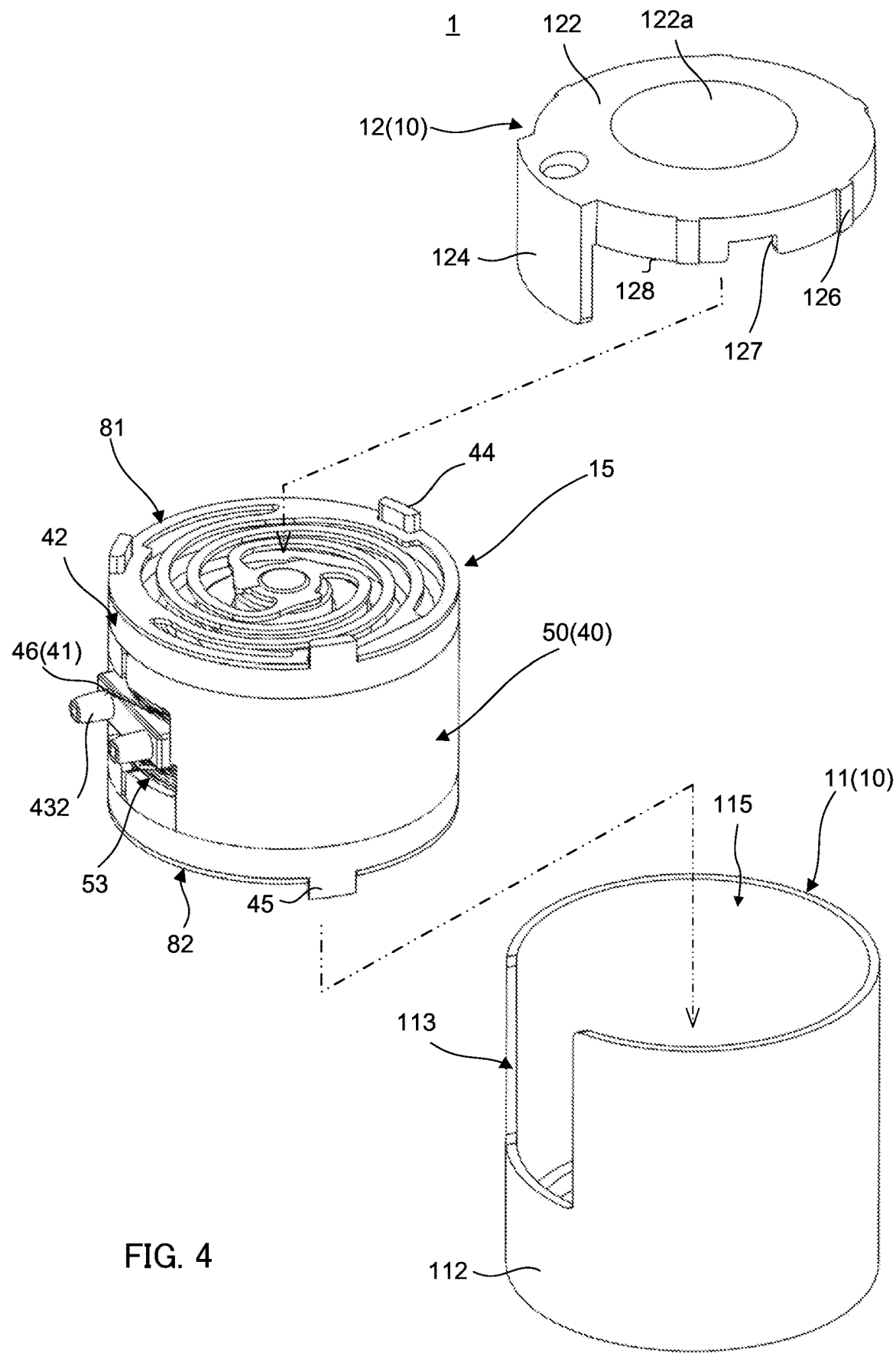
FIG. 4 is a diagram illustrating a state where the case and a drive unit inside it are disassembled in the vibration actuator.

An embodiment of the present invention is elaborated below with reference to the accompanying drawings.
General Configuration of Vibration Actuator FIG. 1 is a perspective view illustrating an external appearance of a vibration actuator according to an embodiment of the present invention as viewed from the front surface side, and FIG. 2 is a perspective view illustrating an external appearance of the vibration actuator according to the embodiment of the present invention as viewed from the back side. In addition, FIG. 3 is a longitudinal sectional view of the vibration actuator. In addition, FIG. 4 is a diagram illustrating a state where the case and the drive unit inside it are disassembled in the vibration actuator. Note that in the present embodiment the "upper" side and the "lower" side are used for the sake of ease of the understanding, and mean one side and the other side of the vibration direction of the movable body in the vibration actuator. That is, when the vibration actuator is mounted to the electric apparatus (see FIG. 22 and FIG. 23), it may be disposed upside down or left to right.

Vibration actuator 1 is mounted as a vibration generation source in an electronic apparatus such as a mobile game terminal apparatus (for example, game controller GC illustrated in FIG. 22) as an electric apparatus, and implements the vibration function of the electronic apparatus. This electronic apparatus includes a mobile apparatus such as a smartphone (for example, mobile terminal M illustrated in FIG. 23). Vibration actuator 1 is mounted in each apparatus such as a mobile game terminal apparatus and a mobile apparatus, and is driven into vibration to provide the user with notification of an incoming call, and a sense of operation and realism.

As illustrated in FIG. 1 and FIG. 2, vibration actuator 1 is a vibrating member including case 10 with a columnar shape as a whole. In case 10, both end surface parts in the axial direction (vibration direction) are formed in a protruding shape, and the center portion of the end surface part is formed in a flat shape.

In the present embodiment, case 10 is a hollow cylinder including case main body 11 with a bottomed cylindrical shape and lid part 12 as illustrated in FIG. 3 and FIG. 4. Details of case 10 will be described later.

As illustrated in FIG. 3 and FIG. 4, vibration actuator 1 is composed of drive unit 15 including movable body 20 configured to vibrate and housed in case 10. When movable body 20 moves, vibration actuator 1 itself functions as a vibrating member. In the present embodiment, drive unit 15 has a columnar shape as a whole, and its central axis (not illustrated in the drawing) is parallel to or coincides with the central axis (not illustrated in the drawing) of case 10 with a similar columnar shape. In addition, in the present embodiment, the vibration direction of movable body 20 is a straight line direction including the F direction and the −F direction (see FIG. 14) extending along the direction of the central axis of columnar drive unit 15.

Vibration actuator 1 includes movable body 20 including magnet 21, first yoke 23 and second yoke 25, fixing body 40 including the coil (a pair of coils 61 and 62), and plate-shaped elastic support parts 81 and 82 that support movable body 20 such that movable body 20 can move back and forth with respect to fixing body 40.

Figure 5:
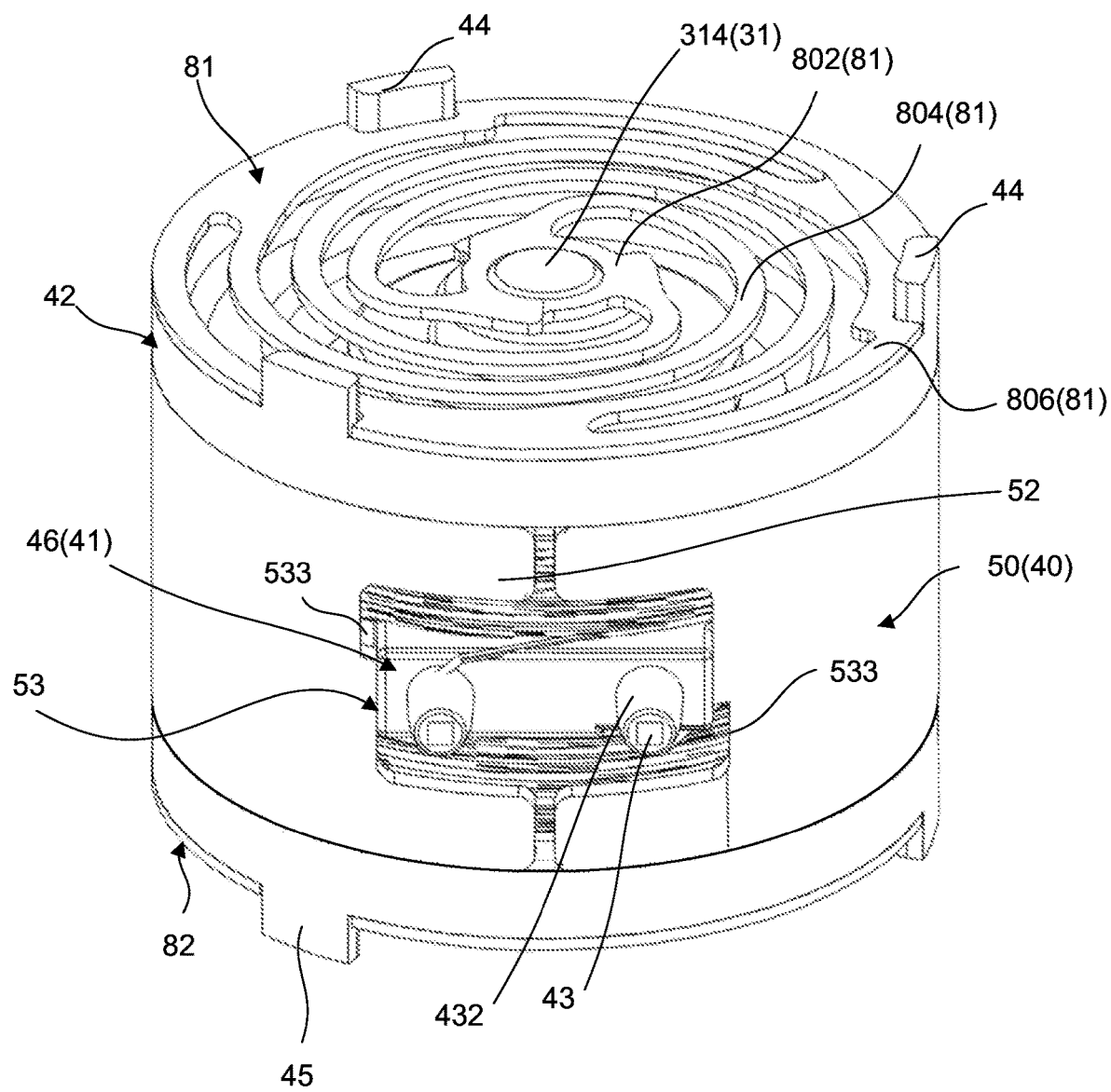
FIG. 5 is a perspective view illustrating an external appearance of a drive unit.
Figure 6:
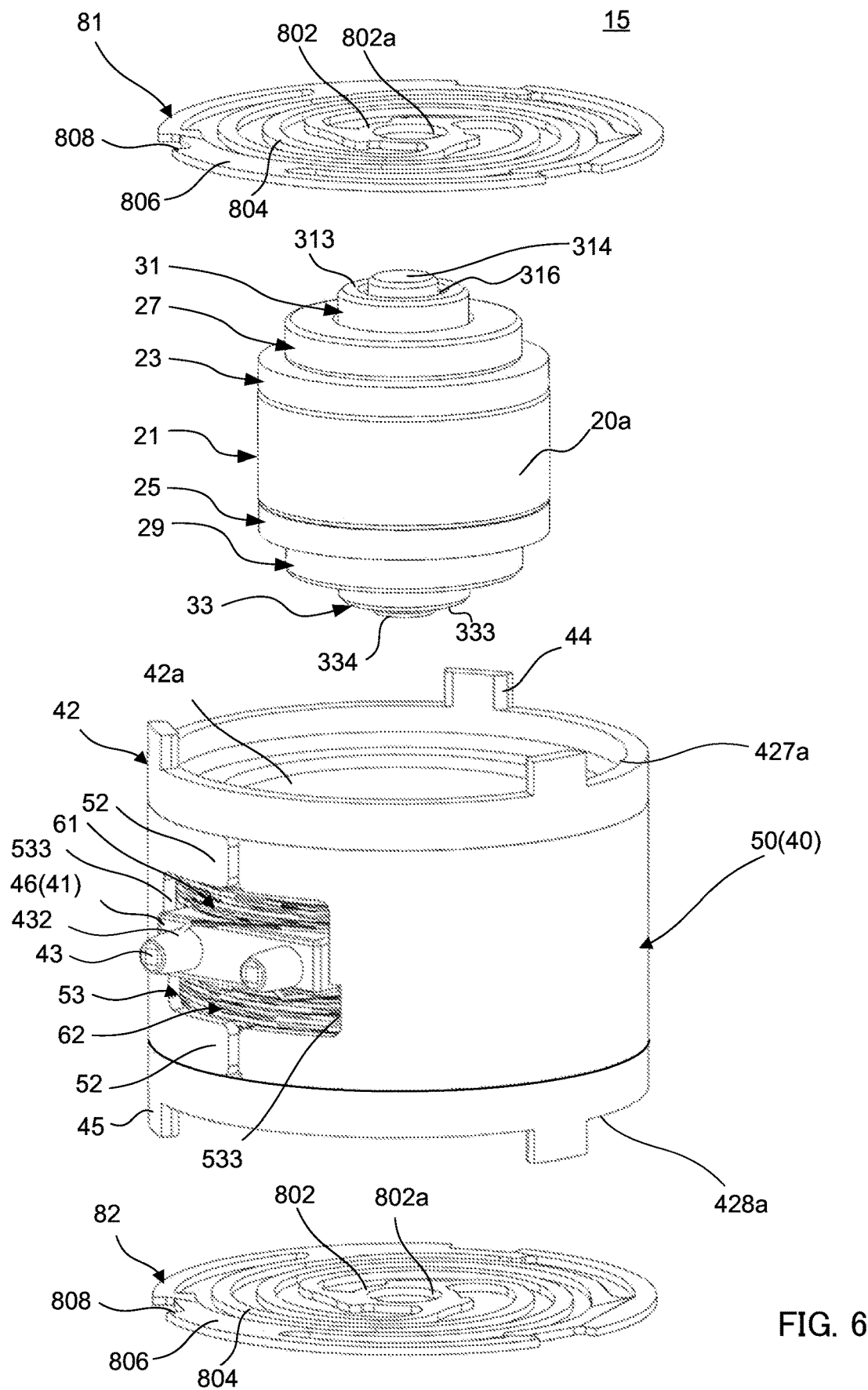
FIG. 6 is an exploded perspective view illustrating a drive unit, illustrating a coil holding part, a movable body and an elastic support part.

FIG. 5 is a perspective view illustrating an external appearance of drive unit 15. More specifically, FIG. 5 is a perspective view as viewed from the terminal tying part side. FIG. 6 is an exploded perspective view of a drive unit illustrating a coil holding part, a movable body and an elastic support part.

Drive unit 15 illustrated in FIG. 3 to FIG. 6 includes coil holding part 42, outer yoke 50, movable body 20, and elastic support parts 81 and 82. Note that together with coils 61 and 62, coil holding part 42 makes up a coil assembly which is a part of a fixing body, and the coil assembly makes up a part of the fixing body together with outer yoke 50. Through elastic support parts 81 and 82 disposed opposite to each other with a space therebetween in the axial direction (vibration direction), drive unit 15 supports movable body 20 disposed in coil holding part 42 such that it can vibrate in a suspended manner with respect to coil holding part 42.

Note that through the terminal tying part (connection part) 43 exposed at its outer peripheral surface, i.e., the outer peripheral surface of coil holding part 42, drive unit 15 is connected to an external device to receive the power supply of the external device.

Movable Body 20

As illustrated in FIG. 3 and FIG. 6, movable body 20 is disposed inside cylindrical coil holding part 42 of fixing body 40 with a space therebetween in the circumferential direction. Movable body 20 has a columnar shape, and is connected with the inner periphery part of elastic support parts 81 and 82 at both end portions (upper and lower end portions) separated in the axial direction, i.e., the vibration direction. Elastic support parts 81 and 82 are attached to cover the openings of cylindrical coil holding part 42. Movable body 20 is supported so as to be movable back and forth in the axial direction along inner peripheral surface 42a of coil holding part 42.

Figure 7:
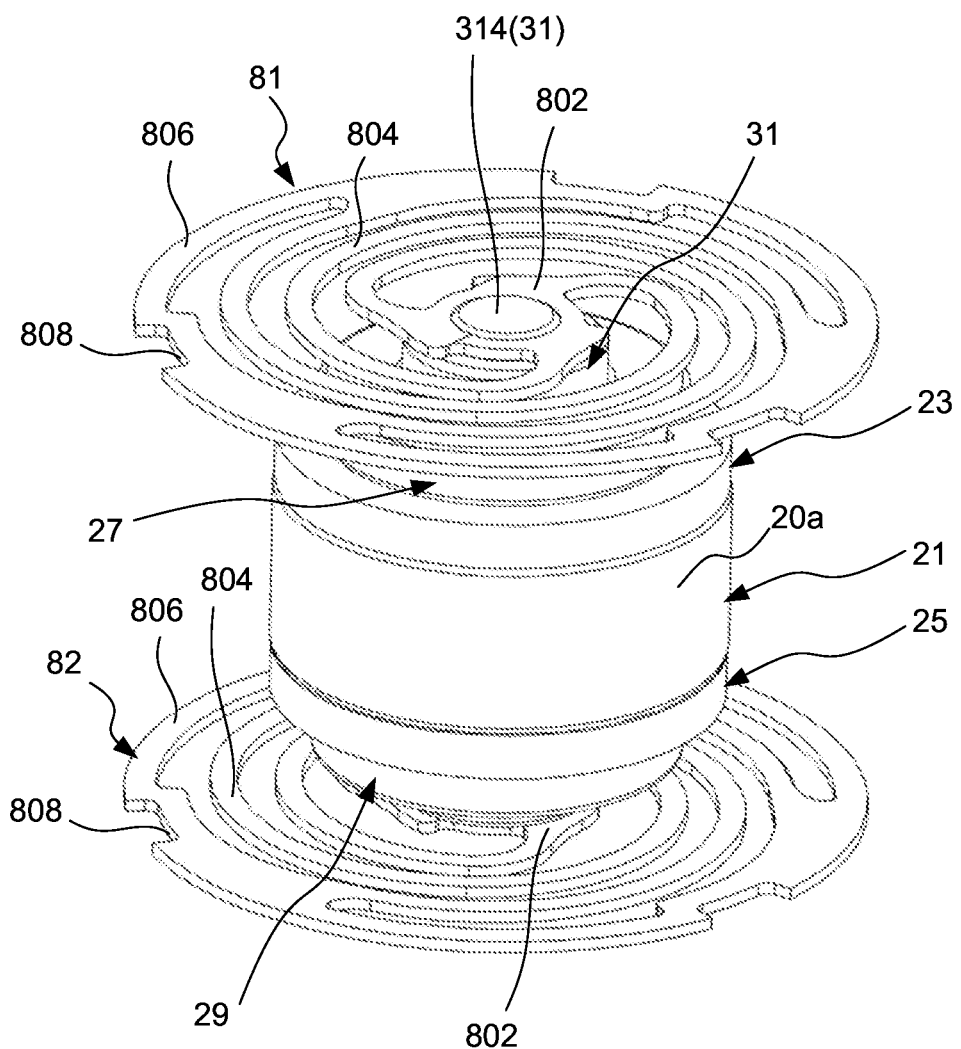
FIG. 7 is a perspective view of a movable body to which an elastic support part is attached.
Figure 8:
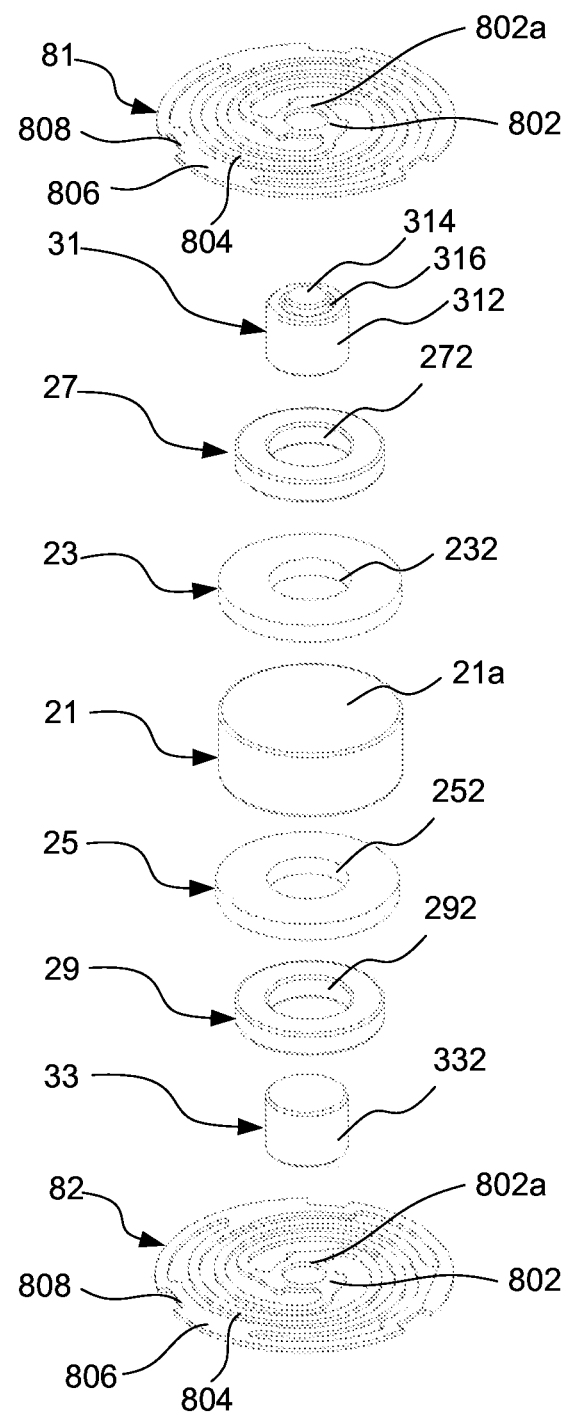
FIG. 8 is an exploded perspective view of a movable body to which an elastic support part is attached.

FIG. 7 is a perspective view of a movable body to which an elastic support part is attached, and FIG. 8 is an exploded perspective view of a movable body to which an elastic support part is attached.

As illustrated in FIG. 3 and FIG. 6 to FIG. 8, movable body 20 includes magnet 21, a pair of movable yokes (for example, first yoke 23 and second yoke 25), a pair of weight parts (weight part 27 and weight part 29) and a pair of connecting parts (first connecting part 31 and second connecting part 33).

In the present embodiment, in movable body 20, magnet 21 is disposed at the center portion in the vibration direction, i.e., the center of movable body 20. On both sides of this magnet 21 in the vibration direction (front surface 21a side and rear surface 21b side, and the vertical direction in each drawing), first yoke 23 and second yoke 25, weight parts 27 and 29 and connecting parts 31 and 33 are provided in a symmetric manner with respect to magnet 21. For example, first yoke 23 and second yoke 25, and weight parts 27 and 29 are provided in a continuous manner on both sides of magnet 21 in the vibration direction. Connecting parts 31 and 33 are inserted and joined to first yoke 23 and weight part 27, and second yoke 25 and weight part 29, respectively. In movable body 20, weight parts 27 and 29 are stacked to magnet 21, first yoke 23 and second yoke 25 in such a manner as to be disposed at a position that does not face outer yoke 50 in fixing body 40 when movable body 20 is at the maximum amplitude position in the vibration direction (see FIG. 16 and FIG. 18). In addition, weight parts 27 and 29 are composed of non-magnetic substance. Thus, the magnetic circuit can be formed in a compact size by suppressing the increase in the size of the configuration of the magnetic circuit of vibration actuator 1. In addition, since weight parts 27 and 29 are composed of a non-magnetic substance that does not affect the magnetic circuit size, the high degree of freedom in design of weight parts 27 and 29 can be achieved while obtaining desired vibration characteristics of movable body 20.

In movable body 20, outer peripheral surface 20a at the center portion, or more specifically, the outer peripheral surface of magnet 21 and first yoke 23, second yoke 25, is disposed in an opposite manner with a predetermined distance therebetween inside inner peripheral surface 42a of coil holding part 42.

Magnet 21

As illustrated in FIG. 6 to FIG. 8, magnet 21 has a solid columnar shape (including a plate shape) magnetized in the vibration direction. For example, in magnet 21, front and rear surfaces 21a and 21b separated in the vibration direction have different respective polarities. In addition, in the present embodiment, magnet 21 is formed in a columnar shape (which may be referred to as circular plate shape) whose diameter (lateral width) is greater than the length (height) in the vibration direction. Magnet 21 is a neodymium sintering magnet, for example.

With respect to the coil held by coil holding part 42 (the pair of coils 61 and 62)(details are described later), magnet 21 is disposed at a position inside the coil (the pair of coils 61 and 62) in the radial direction with a distance therebetween. Here, "radial direction" is also a direction orthogonal to the axis direction (vibration direction) of the coil (the pair of coils 61 and 62). In other words, on the outside in the radial direction, magnet 21 is disposed opposite to the center position of the vibration direction at the inner peripheral surface of coil holding part 42. Note that the pair of coils 61 and 62 is also referred to as "coils 61 and 62".

The "distance" in the radial direction is the distance between coils 61 and 62 and magnet 21 in the state where cylindrical main body part 422 where coils 61 and 62 are wound is located between coils 61 and 62 and magnet 21 on the inside in the radial direction of coils 61 and 62. In addition, the distance is a distance with which they can move without making contact with each other in the vibration direction of movable body 20. The "distance" in the embodiment means a predetermined distance between magnet 21 and coil holding part 42 (especially cylindrical main body part 422) illustrated in FIG. 3.

Magnet 21 may have shapes other than the solid columnar shape, such as cylindrical shapes and plate shapes, as long as it is disposed with the two magnetization surfaces facing in the extending direction of the axis of coils 61 and 62 inside coils 61 and 62. In addition, it is desirable that the center of magnet 21 in the axis direction coincide with the center of movable body 20 in the axis direction.

First Yoke 23 and Second Yoke 25

First yoke 23 and second yoke 25 are magnetic substances, and are fixed to front and rear surfaces 21a and 21b of magnet 21, respectively. Each of first yoke 23 and second yoke 25 is formed in an annular shape. Each of first yoke 23 and second yoke 25 has an outer peripheral surface with the same diameter as magnet 21.

First yoke 23 and second yoke 25 make up a magnetic circuit together with magnet 21, the coil (the pair of coils 61 and 62) and outer yoke 50, and vibration actuator 1. First yoke 23 and second yoke 25 concentrate the magnetic flux of magnet 21, efficiently transmit it without causing leakage, and effectively distribute the magnetic flux flowing between magnet 21 and the coil (the pair of coils 61 and 62). First yoke 23 and second yoke 25 are formed of steel electrolytic cold commercial (SECC) or the like, for example.

In addition, in addition to the function as a part of the magnetic circuit, first yoke 23 and second yoke 25 may have a function as a main body of movable body 20, a function of positioning and fixing connecting parts 31 and 33 to magnet 21, and a function as a weight, in movable body 20.

In the present embodiment, first yoke 23 and second yoke 25 are formed in annular plate shape with the same surface shape and the same outer diameter as magnet 21. First yoke 23 and second yoke 25 are fixed to magnet 21 such that the outer peripheral surface is flush with the outer peripheral surface of the magnet, and make up outer peripheral surface 20a of movable body 20 together with the outer peripheral surface of magnet 21.

In the present embodiment, first yoke 23 and second yoke 25 are similar members that are symmetrically disposed at front and rear surfaces 21a and 21b of magnet 21 (upper and lower surfaces) around magnet 21 with magnet 21 therebetween. Note that first yoke 23 and second yoke 25 may be firmly fixed by being attracted by magnet 21, or may be fixed to magnet 21 with an anaerobic adhesive agent or a heat curable adhesive agent such as epoxy resin, for example.

Yoke openings 232 and 252 are provided at center portions of first yoke 23 and second yoke 25, respectively. Connecting parts 31 and 33 (also referred to as first connecting part 31 and second connecting part 33) are inserted to yoke openings 232 and 252. For example, connecting part 33 may be internally fitted to yoke openings 232 and 252, and may be joined after the insertion.

Yoke openings 232 and 252 are provided such that the axes of connecting parts 31 and 33, or in other words, the central axes of elastic support parts 81 and 82 described later are located on the central axis of movable body 20. Note that while yoke openings 232 and 252 are formed with sized fitted with each other in accordance with the external shapes of connecting parts 31 and 33, this is not limitative. Yoke openings 232 and 252 may be supported so as be fixed and located on the axis of movable body 20 in contact with the outer peripheral surface of the inserted connecting parts 31 and 33 at three or four points. In addition, yoke openings 232 and 252 may be formed in recessed shapes without extending through the axial direction, and connecting parts 31 and 33 may be joined in the recesses.

In a in a non-vibration state, first yoke 23 and second yoke 25 are located inside (on the inside in the radial direction) the coil (the pair of coils 61 and 62) so as to face respective coils (the pair of coils 61 and 62) in the direction orthogonal to the axis direction of the coil (the pair of coils 61 and 62). Preferably, in a non-vibration state of movable body 20, first yoke 23 and second yoke 25 are located on the inside (on the inside in the radial direction) of the pair of coils 61 and 62 so as to face the centers, in the vibration direction, of the pair of coils 61 and 62, respectively, in the direction orthogonal to the vibration direction.

In addition, preferably, in the present embodiment, first yoke 23 and second yoke 25 are configured such that the height position of the top surface of first yoke 23 on the upper side of magnet 21 is located on the lower side (center side) of the upper end position of upper side coil 61. Additionally, it is preferable that the height position of the bottom surface of second yoke 25 of magnet 21 be located on the upper side (center side) of the lower end position of lower side coil 62.

In this manner, together with magnet 21 and coils 61 and 62 and outer yoke 50, first yoke 23 and second yoke 25 serve as a magnetic circuit including a suitable magnetic path with high magnetic efficiency with small magnetic flux leakage.

Weight Parts 27 and 29

Weight parts 27 and 29 are provided to first yoke 23 and second yoke 25 sandwiching magnet 21 so as to sandwich first yoke 23 and second yoke 25.

Weight parts 27 and 29 are disposed in a symmetric manner so as to sandwich magnet 21, first yoke 23 and second yoke 25, and increase the vibration output of movable body 20.

Preferably, weight parts 27 and 29 are configured with a material with high specific gravity. Weight parts 27 and 29 are formed of a material, such as a tungsten (19.3 g/cm³), with higher specific gravity than first yoke 23 and second yoke 25. Preferably, weight parts 27 and 29 are formed of a material with a specific gravity (a specific gravity of about 16 to 19 g/cm³, for example) higher than that of a material such as a silicon steel sheet (the specific gravity of the steel sheet is 7.70 to 7.98 g/cm³). Tungsten may be provided as the material of weight parts 27 and 29, for example. In this manner, even when the dimension of the external shape of movable body 20 is set for the design, the mass of movable body 20 can be relatively easily increased, and a desired vibration output as sufficient sensory vibration for the user can be achieved.

The mass of weight parts 27 and 29 can be changed by changing the size in accordance with the vibration output of movable body 20. The outer diameters of weight parts 27 and 29 are smaller than the outer diameters of first yoke 23 and second yoke 25. In this manner, when movable body 20 vibrates, movable body 20 less easily makes contact with elastic support parts 81 and 82 and thus can favorably vibrate. In this manner, a high vibration output can be ensured while downsizing vibration actuator 1.

Each of weight parts 27 and 29 is formed in an annular shape. Through holes 272 and 292 of weight parts 27 and 29 are formed with the same diameter and the same axes of yoke openings 232 and 252 of first yoke 23 and second yoke 25, while they may have different diameters.

Connecting parts 31 and 33 are inserted to through holes 272 and 292 of weight parts 27 and 29.

Together with yoke openings 232 and 252, through holes 272 and 292 function as positioning parts for positioning to the same axis as the axis of movable body 20 when attaching connecting parts 31 and 33 to the magnet. While weight parts 27 and 29 are continuously provided for each first yoke 23 and second yoke 25 in the present embodiment, two, or three or more, weight parts 27 and 29 may be continuously provided for each first yoke 23 and second yoke 25. While it is preferable to use members with the same configuration for weight parts 27 and 29, this is not limitative as long as they have the same function and mass.

Connecting Parts 31 and 33

Connecting parts 31 and 33 connect magnet 21, first yoke 23 and second yoke 25 to elastic support parts 81 and 82.

In movable body 20, connecting parts 31 and 33 make up the end portion on both sides in the vibration direction, i.e., end portions located on the both sides and separated from magnet 21 in the vibration direction.

In the present embodiment, connecting parts 31 and 33 are columnar members disposed along the central axis of movable body 20, and are interposed between first yoke 23 and second yoke 25, and elastic support parts 81 and 82.

Connecting parts 31 and 33 are disposed to protrude from the respective center portions of front and rear surfaces 21a and 21b of magnet 21, and are inserted to first yoke 23, second yoke 25, and weight parts 27 and 29. Connecting parts 31 and 33 are fixed to first yoke 23, second yoke 25, and weight parts 27 and 29. Further, connecting parts 31 and 33 may be fixed to magnet 21, and are disposed to protrude from weight parts 27 and 29.

Connecting parts 31 and 33 include connection main bodies 312 and 332 provided on one end portion side and fixed to a member making up movable body 20, and support fixing parts 314 and 334 provided on the other end portion side and provided at the other end portion of connection main bodies 312 and 332.

Connection main bodies 312 and 332 have shapes that can be inserted to yoke openings 232 and 252 of first yoke 23 and second yoke 25 and through holes 272 and 292 of weight parts 27 and 29. Since yoke openings 232 and 252 and through holes 272 and 292 of the present embodiment have the same diameter, connection main bodies 312 and 332 are formed in columnar shapes corresponding to yoke openings 232 and 252 and through holes 272 and 292. In the present embodiment, connection main bodies 312 and 332 are positioned by being inserted to yoke openings 232 and 252 and through holes 272 and 292, and fixed to magnet 21, first yoke 23 and second yoke 25, weight parts 27 and 29 and the like.

Connection main bodies 312 and 332 may be fixed to both of first yoke 23 and second yoke 25 and weight parts 27 and 29 through press-fitting. Connecting parts 31 and 33 may be fixed to first yoke 23 and second yoke 25 and weight parts 27 and 29 by bonding using or not using an anaerobic adhesive agent or a heat curable adhesive agent such as epoxy resin, for example.

Connection main bodies 312 and 332 may be joined to magnet 21 in contact with it at the other end surface that faces magnet 21. Connection main bodies 312 and 332 are disposed such that the central axis thereof and the axis line of movable body 20 coincide with each other, and that connection main bodies 312 and 332 protrude to both sides in the vibration direction along its axis line.

Support fixing parts 314 and 334 join movable body 20 to elastic support parts 81 and 82 through connection main bodies 312 and 332 of connecting parts 31 and 33.

Support fixing parts 314 and 334 are portions protruding from the surface of the one end portion side in the axial direction (vibration direction) at connection main bodies 312 and 332, with a smaller outer diameter than the outer diameter of connection main bodies 312 and 332. Note that recesses 316 and 336 are provided around this protruding portion. Recesses 316 and 336 are annular groove parts that surround support fixing parts 314 and 334. Recesses 316 and 336 may function as a bonding material retainer or a welding material retainer at the time of joining with the inner periphery part of elastic support parts 81 and 82, an engaging object portion at the time of caulking, and the like for example. In such cases, recesses 316 and 336 can be firmly joined to movable body 20 and elastic support parts 81 and 82.

More specifically, support fixing part 314 makes up one end portion of movable body 20 in the vibration direction, i.e., the upper end portion of movable body 20, and is joined to inner periphery part 802, which is an internal diameter side end portion of the upper leaf spring, which is elastic support part 81. On the other hand, support fixing part 334 makes up the other end portion of movable body 20 in the vibration direction, i.e., the lower end portion of movable body 20, and is joined to inner periphery part 802, which is the internal diameter side end portion of the lower leaf spring, which is elastic support part 82.

In the state where support fixing parts 314 and 334 are internally fitted and joined to the inner periphery parts 802 and 802 of elastic support parts 81 and 82, the surface of one end portion side of connection main bodies 312 and 332 around support fixing parts 314 and 334 face inner periphery parts 802 and 802. Note that connection main bodies 312 and 332 may be joined to elastic support parts 81 and 82 joined to support fixing parts 314 and 334 at the portion around support fixing parts 314 and 334 at the other end portion thereof. For example, connection main bodies 312 and 332 and elastic support parts 81 and 82 may be joined with an adhesive agent, or joined through welding or the like. In addition, together with another member such as a rivet, connection main bodies 312 and 332 may be joined to elastic support parts 81 and 82 with elastic support parts 81 and 82 therebetween. In this manner, connection main bodies 312 and 332 and inner periphery parts 802 and 802 may be reliably joined to each other, and elastic support parts 81 and 82 and movable body 20 can be more reliably joined.

Further, elastic support parts 81 and 82 and support fixing parts 314 and 334 may be connected through caulking and the like, or through welding and/or bonding combined with caulking. Note that connecting parts 31 and 33 are formed of a copper sintered material, for example. Connecting parts 31 and 33 may be formed of a metal functioning as a weight of movable body 20.

In movable body 20, connecting parts 31 and 33 are disposed at positions outside the magnetic circuit including magnet 21, first yoke 23 and second yoke 25. In this manner, the installation space of the pair of coils 61 and 62 is not limited, i.e., the distance between the magnetic circuit on the movable body side (magnet 21 and first and second yokes 23 and 25) and the pair of coils 61 and 62 is not increased, and thus, electromagnetic conversion efficiency is not reduced. In this manner, the weight of movable body 20 can be favorably increased, and a high vibration output can be achieved.

In addition, in the case where a function as a weight is provided to connecting parts 31 and 33, the vibration output of vibration actuator 1 can be adjusted through mass adjustment with weight parts 27 and 29.

Fixing Body 40

As illustrated in FIG. 3, fixing body 40 includes the pair of coils 61 and 62, and houses movable body 20 including magnet 21 on the inside in the radial direction of the pair of coils 61 and 62. Fixing body 40 movably supports movable body 20 in the axis direction (which is the vibration direction and the coil axial direction) of movable body 20 through elastic support parts 81 and 82.

Figure 9:
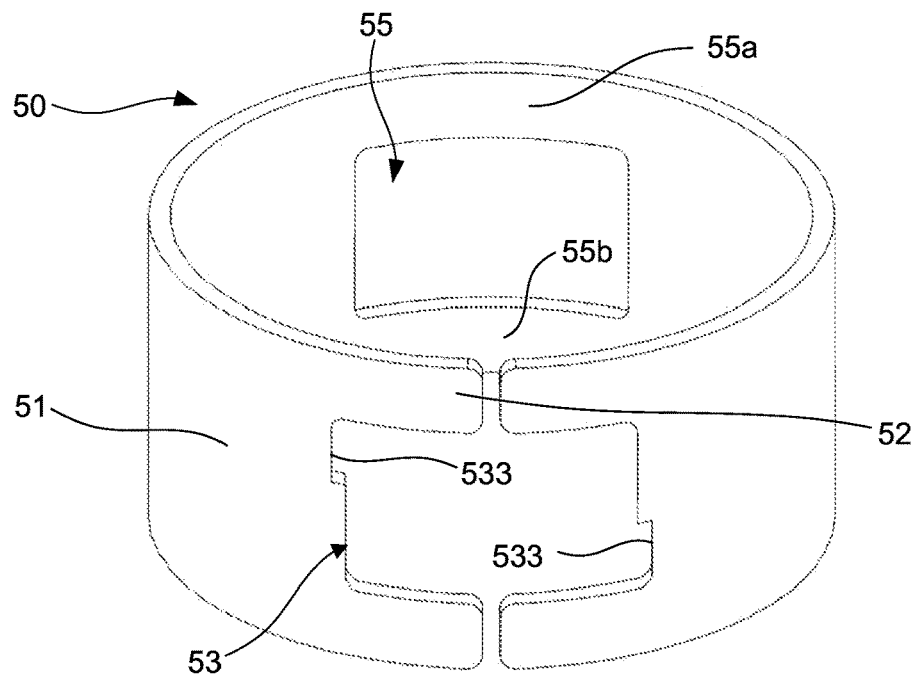
FIG. 9 is a diagram illustrating an outer surface of a coil assembly in which an outer yoke is detached from coil assembly in a drive unit.
Figure 9:
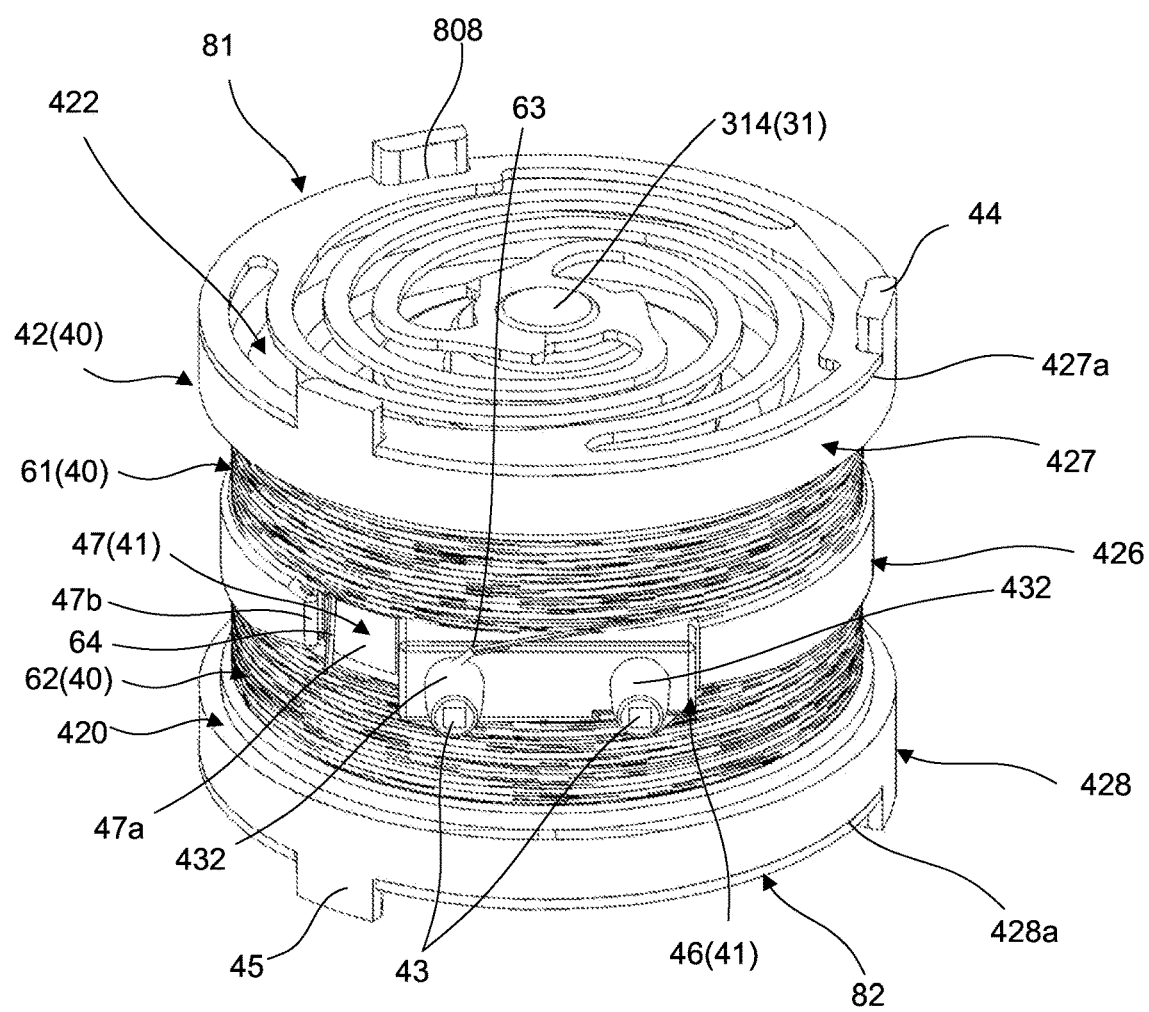
Figure 10:
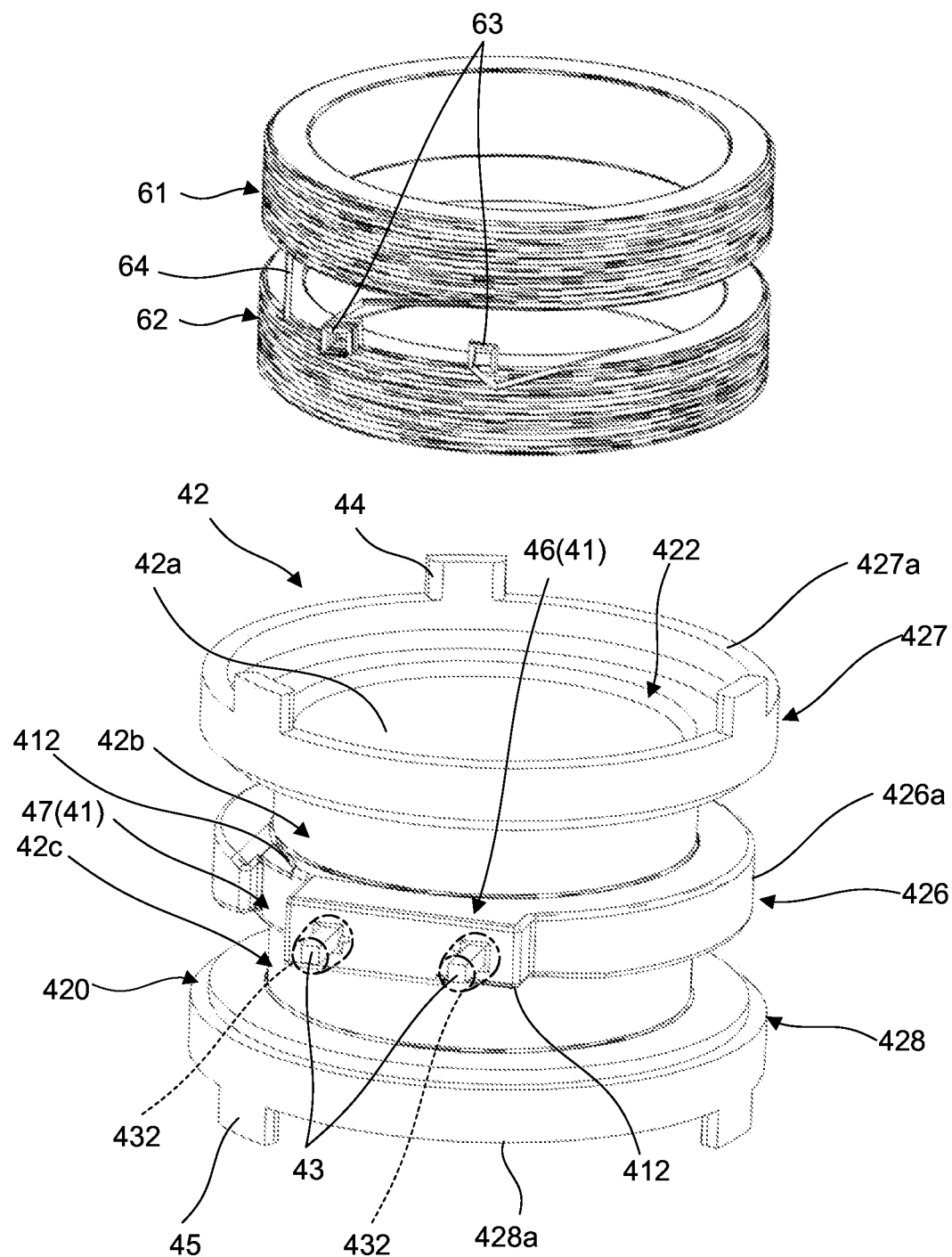
FIG. 10 is a diagram illustrating a state where a coil is detached from a coil holding part in a coil assembly.

FIG. 9 is a diagram illustrating an outer surface of a coil assembly in which an outer yoke is detached from coil assembly in a drive unit, and FIG. 10 is a diagram illustrating a state where a coil is detached from a coil holding part in a coil assembly.

As illustrated in FIG. 3 to FIG. 6, FIG. 9, and FIG. 10, fixing body 40 includes case 10, the coil (the pair of coils 61 and 62), coil holding part 42 that holds coils 61 and 62, and outer yoke 50. Note that together with movable body 20 and elastic support parts 81 and 82, this coil assembly makes up drive unit 15.

Fixing body 40 need not include case 10 as long as it has a configuration of holding the pair of coils 61 and 62 and movably supporting movable body 20 through elastic support parts 81 and 82.

Coil holding part 42 is a cylindrical member formed of a resin such as phenol resin and poly butylene terephthalate (PBT). In the present embodiment, coil holding part 42 is formed of a material containing phenol resin such as highly flame-retardant Bakelite.

Note that with coil holding part 42 composed of a material containing phenol resin, flame retardancy is increased, and the safety in the driving can be improved even when heat is generated by Joule heat due to the current supplied to the coil (the pair of coils 61 and 62) held therein. In addition, since the dimensional accuracy and the positional accuracy of the coil (the pair of coils 61 and 62) are increased, the non-uniformity of vibration characteristics can be reduced.

As illustrated in FIG. 9 and FIG. 10, coil holding part 42 includes cylindrical main body part 422, flange parts 426 to 428 protruding radially outward from the outer peripheral surface of cylindrical main body part 422, layout part 41 including terminal drawing part 46 and connecting groove part 47, and engaging protruding parts 44 and 45.

Coil holding part 42 is formed in a coil bobbin shape with cylindrical main body part 422 and flange parts 426 to 428. Coil holding part 42 includes coil attaching portions 42b and 42c where the coil (the pair of coils 61 and 62) is wound between flange parts 426 to 428.

Cylindrical main body part 422 includes inner peripheral surface 42a that faces the outer peripheral surface of movable body 20 with a predetermined distance therebetween on the inside in the radial direction of the pair of coils 61 and 62. This predetermined distance allows movable body 20 to move in the vibration direction without making contact with inner peripheral surface 42a.

Cylindrical main body part 422 is located between magnet 21 and the pair of coils 61 and 62, thus preventing the contact between magnet 21 and the pair of coils 61 and 62. Cylindrical main body part 422 guides movable body 20 such that it is movable back and forth along inner peripheral surface 42a.

That is, at the time of driving of movable body 20, cylindrical main body part 422 functions as a protecting wall part that protects movable body 20 striking the pair of coils 61 and 62. The thickness of cylindrical main body part 422 is a thickness with a strength with which the pair of coils 61 and 62 on the outer circumference side are not affected even when the moving movable body 20 makes contact with it.

Coil attaching portions 42b and 42c are provided in recessed shapes in the outer peripheral surface of cylindrical main body part 422.

More specifically, coil attaching portions 42b and 42c (see FIG. 10) are formed with the outer peripheral surface of cylindrical main body part 422 and flange parts 426 to 428, so as to open to the outside in the radial direction from the outer peripheral surface of cylindrical main body part 422 to the outer circumference side.

Coil attaching portions 42b and 42c are defined by flange parts 426 to 428. The pair of coils 61 and 62 is wound at coil attaching portions 42b and 42c. The pair of coils 61 and 62 is wound between flange parts (also referred to as "end flange part") 427 and 428 with flange part 426 at the center (hereinafter referred to also as "the center flange part") therebetween in the vibration direction.

Coils 61 and 62 in coil attaching portions 42b and 42c are disposed at positions aligned in the coil axial direction so as to surround the outer peripheral surfaces of first yoke 23 and second yoke 25 of movable body 20 (the outer peripheral surfaces of first yoke 23 and second yoke 25 and magnet 21).

Center flange part 426 is provided in an annular shape protruding radially outward from the outer peripheral surface of cylindrical main body part 422, and includes an annular outer periphery part. Note that layout part 41 for laying out the winding is provided at a part of the outer periphery part of center flange part 426.

The diameter of center flange part 426 excluding terminal drawing part 46, i.e., the diameter of outer periphery part 426a is smaller than the maximum diameter of other flange parts (end flange parts 427 and 428). In this manner, at the outer peripheral surface of coil holding part 42, recessed part 420 is formed at a center portion in the vibration direction and at the opening edge part of coil attaching portions 42b and 42c (see FIG. 9 and FIG. 10).

In this manner, outer yoke 50 is fit to recessed part 420, and outer yoke 50 covers coil attaching portions 42b and 42c where coils 61 and 62 are disposed in the state where its outer surface and the outer surfaces of end flange parts 427 and 428 flush with each other.

With terminal drawing part 46, layout part 41 processes the terminal (winding 63) of coils 61 and 62 to a state where it is connectable to an external device, and connecting groove part 47 guides winding 64 of the coil. In this manner, the winding of the coil (for example winding 64) is laid out such that coil holding part 42 favorably holds coils 61 and 62.

Terminal drawing part 46 includes terminal tying part 43. As illustrated in FIG. 9 and FIG. 10, terminal tying part 43 functions as a connector connection part that ties winding 63 of the end portion of the winding that couples the pair of coils 61 and 62, and connects it to the external device. Terminal tying part 43 connects the pair of coils 61 and 62 and the external device (a power supply part such as a drive control part) and achieves power supply from the external device to the pair of coils 61 and 62.

Terminal tying part 43 is a conductive member provided upright at coil holding part 42, or more specifically, at the outer periphery part of cylindrical main body part 422. Terminal tying part 43 includes a rod member for tying the winding of the coil.

Terminal tying part 43 is provided by press-fitting the base end portion to terminal drawing part 46 provided upright at the outer periphery part of coil holding part 42, or more specifically, the outer peripheral surface of center flange part 426 of coil holding part 42. Winding 63 of the end portion of the winding making up coils 61 and 62 is tied and connected to terminal tying part 43, and this connecting portion is reliably joined with fillet 432 formed by soldering.

Terminal drawing part 46 protrudes from the outer peripheral surface of center flange part 426 so as to have a predetermined length in the radial direction, a thickness in the vibration direction and a width along the circumferential direction at center flange part 426, and ensures a press-fitting margin of terminal tying part 43. The width of terminal drawing part 46 is parallel to the tangent to the outer periphery of center flange part 426. Here, terminal drawing part 46 is formed in a cuboid shape, and, at its end surface, terminal tying part 43, i.e., the both end portions of coils 61 and 62, are provided upright.

Terminal drawing part 46 ensures the press-fitting margin of terminal tying part 43, and thus terminal tying part 43 can be firmly held, and when assembling terminal tying part 43 to coil holding part 42, it can be stably fixed.

Through terminal tying part 43, the terminal drawing part 46 draws out the end portion of the winding of the coil that forms the coil (the pair of coils 61 and 62) to the outside of vibration actuator 1 and connects it to the supply power source. Terminal drawing part 46 are inserted through outer yoke 50 so as to expose terminal tying part 43 to the outside of outer yoke 50, and in turn, the outside of case 10.

Terminal tying part 43 is provided at terminal drawing part 46, and therefore, even when outer yoke 50 makes contact with it and a load of outer yoke 50 is applied thereto at the time of inserting terminal drawing part 46 through outer yoke 50, it can be received by terminal drawing part 46. In this manner, is possible to prevent exertion of the load at the time of attaching outer yoke 50 on terminal tying part 43 and the deformation of terminal tying part 43 due to the exertion of the load, and thus the vibration actuator can be stably manufactured. Note that a bonding part may be provided at the outer peripheral surfaces of flange parts 426 to 428 with the same outer diameter, and outer yoke 50 may be firmly fixed to each of flange parts 426 to 428 through the bonding part. In this manner, more stable vibration characteristics can be achieved.

In connecting groove part 47, winding 64 of the coil that connects the coil (the pair of coils 61 and 62) is inserted. In connecting groove part 47 of the present embodiment, the winding direction of the winding of the coil that forms coil 61 and coil 62 is inverted to opposite directions between upper and lower parts of connecting groove part 47.

Connecting groove part 47 is formed to open radially outward at the outer periphery part of center flange part 426 and to extend through along the vibration direction. More specifically, connecting groove part 47 includes bottom wall part 47a that forms the bottom of a groove, and side wall part (one side wall part) 47b remote from terminal tying part 43 in bottom wall part 47a.

Even when covered with outer yoke 50 in center flange part 426, connecting groove part 47 communicates coil attaching portions 42b and 42c with each other in the vibration direction inside outer yoke 50 in the radial direction. Connecting groove part 47 is disposed close to or adjacent to terminal drawing part 46.

As illustrated in FIG. 9, connecting groove part 47 is a cutout portion with a tilted bottom surface between the parallel wall surfaces of the side wall of terminal drawing part 46 and remote side wall part 47b. The cutout portion has a function of locking the winding such that the winding is not removed when one of coil 61 and coil 62 is wound and disposed and then the other is wound and disposed after inverting the winding direction. Connecting groove part 47 of the present embodiment is formed in a U-shape in plan view with bottom wall part 47a as the bottom surface and the both side wall parts uprightly provided at both ends separated in the circumferential direction.

Thus, when the pair of coils 61 and 62 is disposed by winding the winding of the coil around coil attaching portions 42b and 42c in an inverted manner between the upper and lower parts, winding 64 of the coil is reliably engaged with connecting groove part 47 without being removed from connecting groove part 47. In this manner, winding 64 of the coil is favorably guided from one of coil attaching portions 42b and 42c to the other with connecting groove part 47. Thus, assembling of the pair of coils 61 and 62 to coil holding part 42 of a single winding of the coil can be easily performed.

Note that layout part 41 includes coil guide part 412 (see FIG. 10). At center flange part 426, coil guide part 412 guides winding 63 of the coil from terminal tying part 43 to the first winding position (for example corner portion) of the coil winding portion (one of coil attaching portions 42b and 42c) of coil holding part 42.

Coil guide part 412 is provided at least at one of the upper and lower surfaces (the surfaces separated in the vibration direction) of center flange part 426. In the present embodiment, coil guide part 412 is formed stepwise with respect to terminal drawing part 46 in center flange part 426 at the top surface portion of connecting groove part 47 adjacent in one circumferential direction and the bottom surface portion of terminal drawing part 46.

Coil guide part 412 is an inclined part formed of the step of the upper and lower surfaces (the surfaces in the vibration direction) of center flange part 426, and guides the winding of the coil to the bottom surface side of coil attaching portions 42b and 42c, i.e., to the outer peripheral surface side of cylindrical main body part 422 from terminal tying part 43.

For example, in FIG. 10, after the winding of the coil is tied to one of terminal tying part 43 (for example, terminal tying part 43 on the right side in the drawing), the coil is guided along coil guide part 412 on the coil attaching portion 42c side, and coil 62 is disposed by winding it around coil attaching portion 42c. In this manner, in comparison with it is directly drawn from terminal tying part 43 to coil attaching portion 42c, the winding position of the first winding can be stabilized and coil 62 can be favorably disposed. Then, the winding of the end portion of coil 62 is guided to coil attaching portion 42b through connecting groove part 47, and the winding of the coil is wound to coil attaching portion 42b in the direction opposite to coil 62 and thus, coil 61 is formed and disposed.

In this manner, when winding the winding of the coil extending from terminal tying part 43 to coil attaching portions 42b and 42c, coil guide part 412 can stabilize the winding position of the first winding at coil attaching portions 42b and 42c, and one turn of the winding can be reliably performed.

In this manner, tying of the winding to terminal tying part 43, forming of upper and lower coils 61 and 62, and finally tying to terminal tying part 43 can be performed by a series of flow to assemble vibration actuator 1. In this manner, the coil forming step and the like can be easily automated, and the vibration actuator with an efficient assembly structure can be achieved.

End flange parts 427 and 428 are disposed at both end portions separated in the axis direction of cylindrical main body part 422, and make up the upper and lower end portions of coil holding part 42.

End flange parts 427 and 428 (which are also collectively referred to as "both end flange part") protrude radially outward from the outer periphery of cylindrical main body part 422 to the both end portions in the vibration direction. The outer periphery part of each of end flange parts 427 and 428 has the same diameter portion as outer periphery part 426a of center flange part 426. The same diameter portion makes up recessed part 420 and the outer peripheral surface of the same diameter portion makes contact with the inner peripheral surface of outer yoke 50.

Outer yoke 50 is disposed at this recessed part 420, and thus outer yoke 50 is positioned at the position surrounding the pair of coils 61 and 62. In addition, outer yoke 50 is stably fixed to coil holding part 42 by making contact with outer periphery part 426a and the same diameter portion of end flange parts 427 and 428. In this manner, even in the case where the height (vibration direction length) of outer yoke 50 is large, it can be stably fixed by attaching it in accordance with the height.

End flange parts 427 and 428 are formed in cylindrical shapes opening in the direction separated from center flange part 426 (the vertical direction in the present embodiment). In end flange parts 427 and 428, elastic support parts 81 and 82 are fixed at the end portions of the opening side, i.e., the upper and lower end portions.

Engaging protruding parts 44 and 45 are protruding parts provided upright in the vibration direction (vertical direction) at the upper and lower end portions of coil holding part 42, i.e., annular upper and lower opening edge surfaces (which are also referred to as "upper end surface and lower end surface") 427a and 428a of end flange parts 427 and 428.

Figure 12:
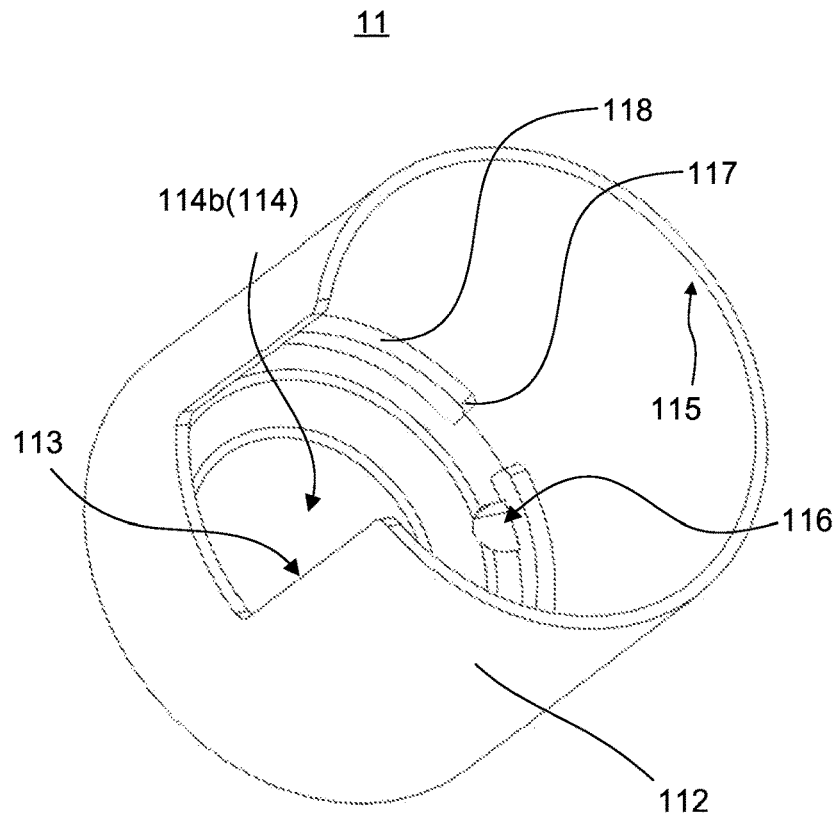
FIG. 12 is a top surface side perspective view of case main body.

As illustrated in FIG. 3 and FIG. 4, engaging protruding parts 44 and 45 are engaged with engaging recess 127 of lid part 12 of case 10, and engaging recess 117 of case main body 11 (see FIG. 12). By engaging with engaging recesses 127 and 117, engaging protruding parts 44 and 45 set the positions of oil holding part 42 and lid part 12 and case main body 11 in the radial direction and the vibration direction, and set the positions of elastic support parts 81 and 82 sandwiched by them in the radial direction.

Engaging protruding parts 44 and 45 are disposed opposite to top surface part 122 of lid part 12 and bottom part 114 of case main body 11, and end flange parts 427 and 428 receive top surface part 122 and bottom part 114 with elastic support parts 81 and 82 therebetween.

By fitting engaging protruding parts 44 and 45 to positioning groove part 808, the positions of elastic support parts 81 and 82 with respect to coil holding part 42 are set. In this manner, the positions of elastic support parts 81 and 82 in each individual drive unit 15 can be uniformed, and the positions of elastic support parts 81 and 82 with respect to coil holding part 42 can be stably set. In this manner, the movement of elastic support parts 81 and 82 in the rotational direction is restricted, and, as a product, the variation in elastic support parts 81 and 82 can be suppressed and stable characteristics can be achieved.

A plurality of engaging protruding parts 44 and 45 are provided around the axis of coil holding part 42 at even interval.

In addition, the plurality of engaging protruding parts 44 and 45 engage with the positioning groove part 808 of elastic support parts 81 and 82. In this manner, the positions of movable body 20 and coil holding part 42 can be easily set by receiving the catching and friction of elastic support parts 81 and 82 at the time of insertion of movable body 20 into coil holding part 42, and assembling it with good assemblability.

In addition, coil holding part 42 is housed and fixed in the case with upper and lower end portions engaging protruding parts 44 and 45 engaged with engaging recesses 127 and 117 of case 10 so as to face the edge of lid part 12 and the edge of b bottom part 114.

Coils 61 and 62

In vibration actuator 1, the pair of coils 61 and 62 makes up a magnetic circuit used for generating the driving source together with magnet 21, first yoke 23 and second yoke 25 with the axis direction of the pair of coils 61 and 62 (magnet 21 magnetization direction) as the vibration direction.

The pair of coils 61 and 62 are energized at the time of driving (vibration), and makes up a voice coil motor together with magnet 21. Note that while the pair of coils 61 and 62 is provided in the present embodiment, one coil or three or more coils may be provided as long as a magnetic circuit to be driven is configured in a similar manner, but it is preferable to provide even-numbered coils symmetrically disposed about the vibration direction of the coil.

The pair of coils 61 and 62 is disposed at positions in a symmetric manner about magnet 21 in the vibration direction with respect to movable body 20 including magnet 21, first yoke 23 and second yoke 25 and the like. It is preferable that the center of the length in the vibration direction of the coil, i.e., the center of the length between the upper end of coil 61 and the lower end of coil 62 coincide (or substantially coincide) with the center of the length in the vibration direction of movable body 20 (in particular magnet 21) in the vibration direction.

In the present embodiment, the pair of coils 61 and 62 is composed of single winding of the coil wound in the directions opposite to each other, and current flows in opposite directions for coils 61 and 62 when energized.

The end portion of each of the pair of coils 61 and 62, i.e., the both end portions of the winding of the coil making up the pair of coils 61 and 62 are tied and connected to terminal tying part 43 of flange part 426.

The coil (the pair of coils 61 and 62) is connected to the power supply part (for example, drive control part 203 illustrated in FIG. 22 and FIG. 23) through terminal tying part 43. For example, the end portion of the coil (the pair of coils 61 and 62) is connected to the alternating current supply part through terminal tying part 43, and the alternating current power (AC voltage) is supplied from the alternating current supply part to the coil (the pair of coils 61 and 62). In this manner, with the magnet, the coil (the pair of coils 61 and 62) can generate a thrust for moving toward or away from each other in the axis direction.

As illustrated in FIG. 10, in the coil (the pair of coils 61 and 62), the other end portion side of the winding of the coil whose one end portion is tied to one of terminal tying part 43 is guided to the position where the first turn is formed in coil attaching portion 42c at the step in coil guide part 412 on coil attaching portion 42c side. The first turn is formed by wounding the winding counterclockwise at the first turning position, and then it is sequentially wound counterclockwise so as to form coil 62.

Next, the winding of the other end portion side of coil 62 is guided to coil attaching portion 42b by connecting groove part 47 in the above-mentioned manner, and sets it at the first turn position of coil attaching portion 42b by reversing the winding direction in connecting groove part 47. Thereafter, it is wound in the direction opposite to coil attaching portion 42c, here, in the clockwise direction, and thus wind coil 61 is formed in coil attaching portion 42b. Note that while the coil (the pair of coils 61 and 62) is composed of single winding in the present embodiment, this is not limitative, and it may be composed of separate coils (the pair of coils 61 and 62). In this configuration, in the case where the coils as separate members are composed of windings wound in the same direction, they supply respective currents of different directions at the time of driving.

Note that it is preferable that the coil axis of the pair of coils 61 and 62 be disposed on the same axis as the axis of coil holding part 42 or the axis of magnet 21.

In vibration actuator 1, the pair of coils 61 and 62 is formed in a cylindrical shape by winding the coil line from the outside of coil holding part 42 to coil attaching portions 42b and 42c. In this manner, coils 61 and 62 can be assembled without using self-welding line, and cost reduction of the coil (the pair of coils 61 and 62) itself, and in turn, the cost reduction of the entire vibration actuator are achieved.

Outer Yoke 50

Figure 11:
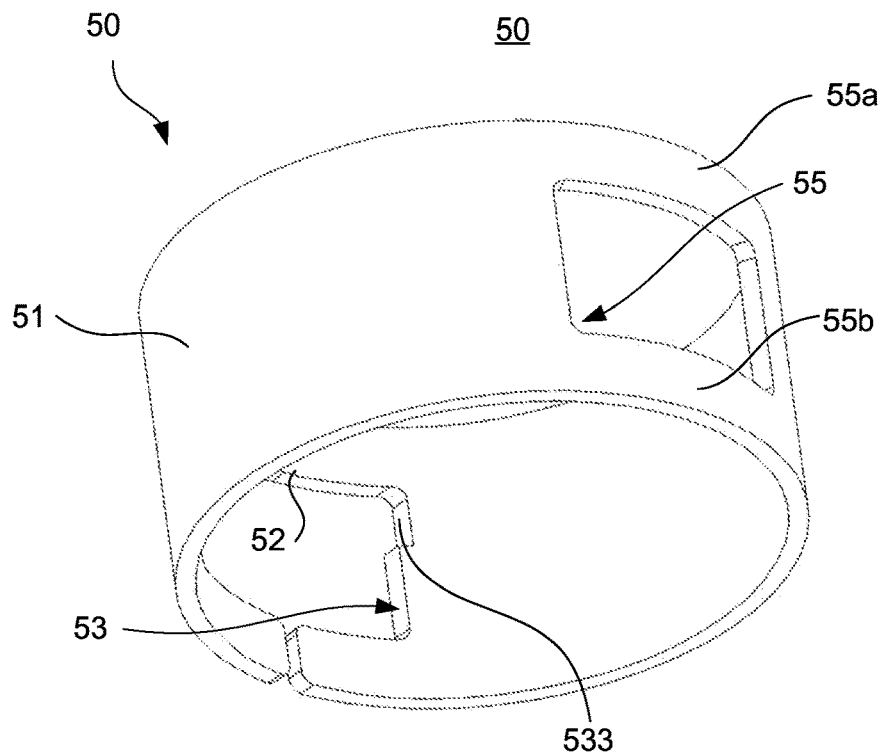
FIG. 11 is a bottom surface side perspective view of an outer yoke.

FIG. 11 is a bottom surface side perspective view of an outer yoke. As illustrated in FIG. 3 to FIG. 6, FIG. 9, and FIG. 11, outer yoke 50 is a cylindrical magnetic substance that surrounds the outer peripheral surface of coil holding part 42 and is disposed at a position covering the pair of coils 61 and 62 on the outside in the radial direction.

As described above, outer yoke 50 makes up the fixing body side magnetic circuit together with the pair of coils 61 and 62 and makes up a magnetic circuit together with the movable body side magnetic circuit, i.e., magnet 21, first yoke 23 and second yoke 25. Outer yoke 50 prevents leakage flux to the outside of vibration actuator 1 in the magnetic circuit.

In the magnetic circuit, outer yoke 50 can increase the electromagnetic conversion efficiency by increasing the thrust constant. Outer yoke 50 functions as a magnetic spring together with magnet 21 by using the magnetic attractive force of magnet 21. Thus, outer yoke 50 can reduce the stress when elastic support parts 81 and 82 serve as machine springs, and can improve the durability of elastic support parts 81 and 82.

In vibration actuator 1, when coils 61 and 62 are energized through terminal tying part 43, movable body 20 moves back and forth in the vibration direction in case 10 with coils 61 and 62 and magnet 21 in conjunction with each other.

Outer yoke 50 is disposed such that the center of the length of outer yoke 50 in the vibration direction coincides with the center of magnet 21 disposed inside in the vibration direction. With the shield effect of this outer yoke 50, leakage magnetic flux to the outside of the vibration actuator can be reduced.

The both end portions separated in the vibration direction in outer yoke 50 are located at positions lower than the both end portions of movable body 20 in the vibration direction when movable body 20 moves. That is, outer yoke 50 in the vibration direction, has a length that does not cover the both end portions of the movable range of a stacked member in which magnet 21, first yoke 23 and second yoke 25 are stacked.

Outer yoke 50 includes yoke main body 51 and a plurality of openings (first opening 53 and second opening 55) disposed at the same position as yoke main body 51 in the vibration direction and dispersed in the circumferential direction.

Yoke main body 51 is formed in a cylindrical shape, by using an electricity zinc plating steel sheet (SECC) with excellent welding performance and corrosion resistance, for example.

In the present embodiment, yoke main body 51 has flexibility and includes a slit that is parallel to the axial direction in a part of the peripheral wall. Yoke main body 51 has a C-cylindrical shape in plan cross-sectional view. In yoke main body 51, at the time of attaching to the outer periphery coil holding part 42, coil holding part 42 is disposed into yoke main body 51 by widening the part between end portions 52 making up the slit. Next, the deformation of yoke main body 51 is reset, and yoke main body 51 is fit to recessed part 420 of the outer periphery of coil holding part 42, and thus, yoke main body 51 is inserted outside coil holding part 42.

A plurality of openings 53 and 55 is provided at yoke main body 51 such that edges that are opposite to each other in the vibration direction are disposed at the same position between openings 53 and 55. In yoke main body 51, the plurality of openings 53 and 55 open at positions opposite to each other with the axis of outer yoke 50 at the center, for example.

Each of the plurality of openings 53 and 55 is provided at the center portion in the vibration direction in yoke main body 51. The plurality of openings 53 and 55 may be provided at even intervals in the circumferential direction in yoke main body 51.

In the present embodiment, the plurality of openings 53 and 55 is formed in rectangular shapes in yoke main body 51 that are defined by parallel side portions separated in the circumferential direction in the circumferential direction, and are defined by upper and lower portions separated into symmetrical shapes in the vibration direction in the vibration direction.

The plurality of openings 53 and 55 includes first opening 53 for inserting a wiring for connecting the external device and coils 61 and 62, and second opening 55 provided at a predetermined position based on the position of first opening 53. Note that opening 53 is provided to extend in the circumferential direction at the center portion of the slit of yoke main body 51. The upper and lower portions that define opening 53 are formed of end portions 52 protruding in the circumferential direction to face each other in the circumferential direction in yoke main body 51.

Terminal drawing part 46 is inserted to opening 53. In this manner the terminal tying part (wiring) 43 connected to coils 61 and 62 passes through opening 53, and terminal tying part (wiring) 43 is protruded and exposed to the outside of outer yoke 50 so as to be able to connect to the external device.

In addition, opening 53 functions as a stopper for stopping the rotation of outer yoke 50 in the circumferential direction with respect to coil holding part 42 by being fitted to terminal drawing part 46.

In opening 53, cutout part 533 with a shape cut out to widen opening 53 is provided at edges diagonally disposed at the left and right side portions that define opening 53. That is, opening 53 has a cut out shape in which the portions of the edges extending along the vibration direction are shifted in the circumferential direction.

The end portion of the winding connected to terminal tying part 43 is set in cutout part 533. When outer yoke 50 is fit to recessed part 420 of coil holding part 42, terminal drawing part 46 is disposed to close opening 53 in opening 53. At this time, in cutout part 533 cut out with a shift in the circumferential direction, the winding for connecting terminal tying part 43 of terminal drawing part 46 and coils 61 and 62 inside outer yoke 50 is set without being blocked. Thus, outer yoke 50 can be favorably attached to coil holding part 42 without being interfered by the winding of the coil.

In outer yoke 50, the left and right side portions that define opening 53 in the circumferential direction may be formed to sandwich terminal drawing part 46. In this case, the protruding side portion adjacent to cutout part 533 can hold terminal drawing part 46 by pressing terminal drawing part 46 from the both sides in the circumferential direction. In this manner, outer yoke 50 can reliably attach, to coil holding part 42, terminal drawing part 46 sandwiched in the circumferential direction.

In addition, opening 53 is divided by terminal drawing part 46 into two regions separated in the vibration direction, and belt-shaped opening regions extending in the circumferential direction and communicated with cutout part 533 are formed on both (upper and lower) sides in the vibration direction with respect to terminal drawing part 46. In the belt-shape region including cutout part 533, the winding for connecting terminal tying part 43 and coil attaching portions 42b and 42c is favorably disposed.

Opening (second opening) 55 is provided at a position opposite to opening 53 with respect to the center of the radial direction. In yoke main body 51, opening 55 is formed at a position opposite to opening 53, for example. Opening 55 is defined by the upper, lower, left and right side portions and extended in the circumferential direction in a rectangular shape that is substantially the same shape as that of opening 53.

The width of upper and lower portions 55a and 55b that define opening 55 in the vibration direction is substantially the same as the width of the upper and lower portions of opening 53 in the vibration direction.

Openings 53 and 55 form magnetic paths that are symmetric about the axis in the magnetic circuit, and keeps the balance of the generated magnetism. That is, in openings 53 and 55, movable body 20 and fixing body 40 are equally attracted to each other in the vibration direction and the direction orthogonal to the vibration direction (radial direction), i.e., the upper, lower, left and right directions. In this manner, movable body 20 vibrates with respect to the fixing body in an equally attracted state in the radial direction.

In this manner, openings 53 and 55 are formed in the center portion of outer yoke 50 in the vibration direction, with a shape that is longer in the circumferential direction than in the vibration direction (vertical direction). Since the upper and lower portions of outer yoke 50 are provided on the upper and lower sides of openings 53 and 55, the leakage flux and imbalance of the magnetic attractive force in the magnetic circuit can also be minimized with a good balance.

Note that in the present embodiment, the upper and lower portions that define opening 53 are divided by the slit sandwiched by end portion 52 in the circumferential direction, which is different from a configuration in which no slit is provided at the upper and lower portions. However, at the division at the upper and lower portions in opening 53, the distance between end portions 52 facing each other through the cutout in the circumferential direction is small, and thus it has a function similar to that of the upper and lower portions with no slit, and has similar effects in terms of a magnetic circuit.

While openings 53 and 55 are provided at opposite two locations facing the center portion in the vertical direction (vibration direction) in outer yoke 50 in the present embodiment, two or more openings may be provided as long as they are formed at even intervals about the axis of outer yoke 50 at the center.

Elastic Support Parts 81 and 82

As illustrated in FIG. 3 to FIG. 9, elastic support parts 81 and 82 support movable body 20 with respect to fixing body 40 so as to be movable back and forth in the vibration direction.

Elastic support parts 81 and 82 sandwich movable body 20 in the vibration direction of movable body 20, and are provided over to intersect both movable body 20 and fixing body 40 in the vibration direction.

In the present embodiment, as illustrated in FIG. 3 to FIG. 9, elastic support parts 81 and 82 are attached parallel to each other over both end portions (upper and lower end portions) of coil holding part 42 separated in the vibration direction, and both end portions of the movable body.

Elastic support parts 81 and 82 are formed in a circular plate-shape in which annular inner periphery part 802 serving as an inner spring end portion and annular outer periphery part 806 serving as outer spring end portion are joined by elastically deformable deformation arm 804 with an arc shape in plan view.

Deformation arm 804 is disposed in a spiral shape that connects inner periphery part 802 and outer periphery part 806, and inner periphery part 802 and outer periphery part 806 are relatively displaced in the axial direction through deformation of deformation arm 804.

Elastic support parts 81 and 82 support movable body 20 so as to be movable in the axial direction (the vibration direction) without making contact with fixing body 40.

Elastic support parts 81 and 82 are a plurality of plate-shaped leaf springs. Movable body 20 may have a plurality of elastic support parts 81 and 82 as three or more leaf springs. The plurality of leaf springs is attached along the direction orthogonal to the vibration direction.

Note that even in the case where movable body 20 is driven (vibrated), or an external impact is received, elastic support parts 81 and 82 make contact with inner peripheral surface 42a of cylindrical main body part 422 of movable body 20 without making contact with the pair of coils 61 and 62, and thus they are not damaged. In addition, elastic support parts 81 and 82 may be composed of any parts as long as they movably elastically support movable body 20. In the present embodiment, elastic support parts 81 and 82 are members with the same configurations.

Inner periphery part 802 includes connection hole 802a disposed at a center of elastic support parts 81 and 82. Both end portions (connecting parts 31 and 33 support fixing parts 314 and 334) of movable body 20 separated in the vibration direction are fit and connected to connection hole 802a. Inner periphery part 802 is fit in a sandwiching manner in the direction orthogonal to the protruding direction of support fixing parts 314 and 334.

On the other hand, outer periphery part 806 is attached to the upper and lower end portions of coil holding part 42, i.e., opening edge surfaces 427a and 428a of end flange parts 427 and 428. Outer periphery part 806 may be fixed to opening edge surfaces 427a and 428a of end flange parts 427 and 428 by being bonded and the like to opening edge surfaces 427a and 428a with an adhesive agent and the like. In addition, outer periphery part 806 may be fixed in a sandwiched manner between opening edge surfaces 427a and 428a and positioning surface parts 128 and 118 of case 10 side with engaging protruding parts 44 and 45 positioned and engaged with positioning groove part 808. In the present embodiment, outer periphery part 806 is fixed in a sandwiched state between opening edge surfaces 427a and 428a and positioning surface parts 128 and 118 of case 10 side.

The leaf springs serving as elastic support parts 81 and 82 may be formed of any elastically-deformable materials, and may be formed by sheet metal processing using a stainless-steel sheet, a phosphor blue copper and the like. In the present embodiment, elastic support parts 81 and 82 are composed of thin disc-shaped spiral springs formed of phosphor blue copper with high workability, high corrosion resistance, and high pull strength and wear resistance. In addition, by forming it with non-magnetic substances such as phosphor blue copper, the magnetic flux flow of the magnetic circuit is not disrupted at all. Elastic support parts 81 and 82 may be formed of resin as long as movable body 20 is support such that it can be vibrated. In addition, elastic support parts 81 and 82 has a plate shape and thus can achieve improvement of positional accuracy, i.e., improvement of processing accuracy in comparison with cone shaped springs.

In the present embodiment, the plurality of elastic support parts 81 and 82 are joined to coil holding part 42 and movable body 20 with the same spiral direction.

In this manner, in the present embodiment, as the plurality of elastic support parts 81 and 82, a plurality of spiral leaf springs is used in the same spiral direction, and attached to both end portions separated in the vibration direction in movable body 20 so as to elastically support movable body 20 with respect to fixing body 40.

In this manner, when the movement amount of movable body 20 is increased, the movable body moves in the translation direction (here, the direction on the plane perpendicular to the vibration direction) while being rotated although this movement is slight. When the spiral directions of the plurality of leaf springs are opposite directions, the plurality of leaf springs move in the buckling direction or the pulling direction, and smooth movement is hindered.

In the present embodiment, elastic support parts 81 and 82 are fixed to movable body 20 such that the spiral directions are the same direction, and thus, even when the movement amount of movable body 20 is increased, smooth movement, i.e., deformation, along the vibration direction can be achieved. Thus, a larger amplitude can be achieved, and the vibration output can be increased. It should be noted that, depending on the desired vibration range of movable body 20, the spiral directions of the plurality of elastic support parts 81 and 82 may be opposite to each other.

Plate-shaped elastic support parts 81 and 82 are disposed such that inner periphery parts 802 of elastic support parts 81 and 82 overlap spring fixing parts 313 and 333 of the end portion of movable body 20 in the vibration direction with respect to movable body 20. Note that it may be joined to inner periphery part 802 with an adhesive agent and the like applied to spring fixing parts 313 and 333. In this case, spring fixing parts 313 and 333 may be firmly joined to inner periphery part 802 through an adhesive agent retained in a cutout formed in an arc shape around inner periphery part 802.

In addition, outer periphery part 806 of elastic support part 81 is positioned and fixed on annular opening edge surface 427a of end flange part 427 while avoiding engaging protruding part 44. On the other hand, outer periphery part 806 of elastic support part 82 is positioned and fixed on annular opening edge surface 428a of end flange part 428 while avoiding engaging protruding part 45.

In this manner, with opening edge surfaces 427a and 428a of upper and lower opening edge parts of coil holding part 42 and lid part 12 and bottom part 114 of case 10, elastic support parts 81 and 82 are sandwiched in the direction orthogonal to the vibration direction.

In addition, elastic support parts 81 and 82 are attached to coil holding part 42 and movable body 20 housed inside coil holding part 42 so as to close the upper and lower openings of coil holding part 42 with the pair of coils 61 and 62 wound on the outer circumference side.

Elastic support parts 81 and 82 fit connection hole 802a of inner periphery part 802 to support fixing parts 314 and 334 of the upper and lower end portions of movable body 20. Then, positioning groove part 808 are engaged with protruding parts 44 and 45, and outer periphery part 806 is fixed in contact with opening edge surfaces 427a and 428a of coil holding part 42. In this manner, drive unit 15 in which the positional relationship between the coil (the pair of coils 61 and 62) and movable body 20 is defined is configured, and it can be easily disposed in case 10.

Case 10

Figure 13:
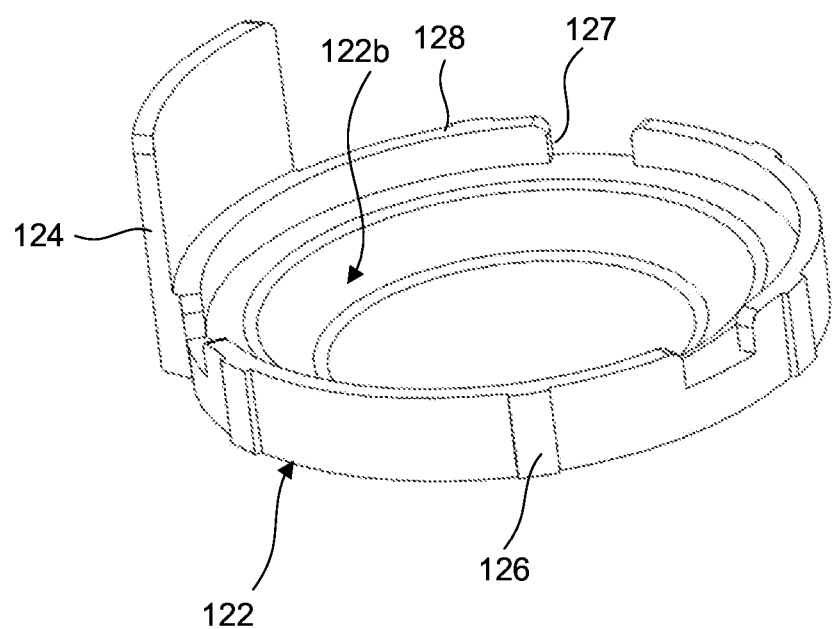
FIG. 13 is a bottom surface side perspective view of a lid part.

FIG. 12 is a top surface side perspective view of case main body 11, and FIG. 13 is a bottom surface side perspective view of lid part 12.

As illustrated in FIG. 1 to FIG. 4, FIG. 12, and FIG. 13, case 10 houses drive unit 15 by closing opening 115 of bottomed cylindrical case main body 11 with lid part 12.

Case main body 11 is formed by closing one opening of cylindrical peripheral wall part 112 with bottom part 114. Cutout part 113 with a shape obtained by cutting out opening 115 side that is the other opening is provided at peripheral wall part 112.

Lid part 12 and bottom part 114 in case 10 make up top surface part 122 and bottom surface part (bottom part 114) of vibration actuator 1 in the present embodiment, and are disposed opposite to movable body 20 of drive unit 15 in the vibration direction of movable body 20 with a predetermined distance therebetween. Lid part 12 extends downward from a part of the outer periphery part, and includes downward part 124 that engages with cutout part 113 of case main body 11.

As illustrated in FIG. 2 and FIG. 3, bottom part 114 includes ventilation hole 116 that emits compression air formed by the reciprocation of movable body 20 to the outside.

Ventilation hole 116 extends through the outer periphery part of bottom part 114. In case main body 11, ventilation hole 116 is formed at a position opposite to cutout part 113 with respect to the central axis therebetween. In other words, in vibration actuator 1, the position where terminal tying part 43 protrudes from the outer periphery is located on the opposite side with respect to the axis therebetween.

In addition, ventilation hole 116 is provided at a location where movable body 20 does not strike even when movable body 20 is displaced and elastic support parts 81 and 82 are deformed due to an external large load applied to case 10 due to dropping of the actuator itself and the like. In addition, ventilation hole 116 is provided at the corner portion with a high strength where bottom part 114 and peripheral wall part 112 are joined in case 10. Case 10 including ventilation hole 116 in this manner can also prevent deformation of case 10 due to exertion of a large load.

Lid part 12 and bottom part 114 define the movable range of movable body 20 of drive unit 15. Cone-shaped (inverted truncated cone-shaped) recesses 122b and 114b are provided at top surface part 122 of lid part 12 and the rear surface of bottom part 114 of case main body 11, respectively. The tilted peripheral surfaces of recesses 122b and 114b are formed along the deformation state of elastic support parts 81 and 82.

Together with the internal space of end flange parts 427 and 428 that open in the vibration direction of the housed drive unit 15, recesses 122b and 114b define the movable space of movable body 20 and elastic support parts 81 and 82. Note that movable body 20 is driven in this movable space, and this movable space is a space of a range where the plastic deformation of elastic support parts 81 and 82 does not occur. Thus, even in the case where a force exceeding the movable range is applied to movable body 20, elastic support parts 81 and 82 make contact with fixing body 40 (at least one of lid part 12 and bottom part 114) without causing plastic deformation, and thus the reliability can be increased with no damage to elastic support parts 81 and 82.

At bottom part 114 of case main body 11 and the surface of top surface part 122 of lid part 12, center portions 114a and 122a are swollen in a planar fashion.

In addition, the rear surface of bottom part 114 illustrated in FIG. 12 includes positioning surface part 118 provided upright from the outer periphery, and engaging recess 117 formed with a predetermined distance between positioning surface parts 118.

The rear surface of top surface part 122 illustrated in FIG. 13 includes positioning surface part 128 provided upright from the outer periphery, and engaging recess 127 formed with a predetermined distance between positioning surface parts 128.

In addition, at outer peripheral surface of top surface part 122, fitting protrusion 126 that radially protrudes and fits to opening 115 of case main body 11 is provided.

When attaching lid part 12 to case main body 11, drive unit 15 is inserted into case main body 11. At this time, drive unit 15 is positioned and housed inside case main body 11 by engaging protruding part 45 with engaging recess 117 while inserting terminal drawing part 46 into cutout part 113.

In addition, positioning surface part 118 sandwiches outer periphery part 806 of elastic support part 82 between it and opening edge surface 428a of end flange part 428. Next, while fitting downward part 124 of lid part 12 in cutout part 113, top surface part 122 is inserted into opening 115 and closed. At this time, engaging protruding part 44 engages with engaging recess 127 and positioning surface part 128 sandwiches outer periphery part 806 of elastic support part 81 between it and opening edge surface 427a of end flange part 427. By closing the gap between fitting protrusions 126 with a bonding material or the like with fitting protrusion 126 in contact with the inner peripheral surface of opening 115, lid part 12 is fixed to case main body 11.

In the present embodiment, downward part 124 and terminal drawing part 46 of coil holding part 42 are disposed in cutout part 113 of case 10, and it is closed with terminal drawing part 46 and downward part 124. In this manner, terminal tying part 43 is disposed to protrude outward from the outer peripheral surface of case 10, and vibration actuator 1 makes it easier to perform connection with the external device through terminal tying part 43.

Operation of Vibration Actuator 1

Figure 14:
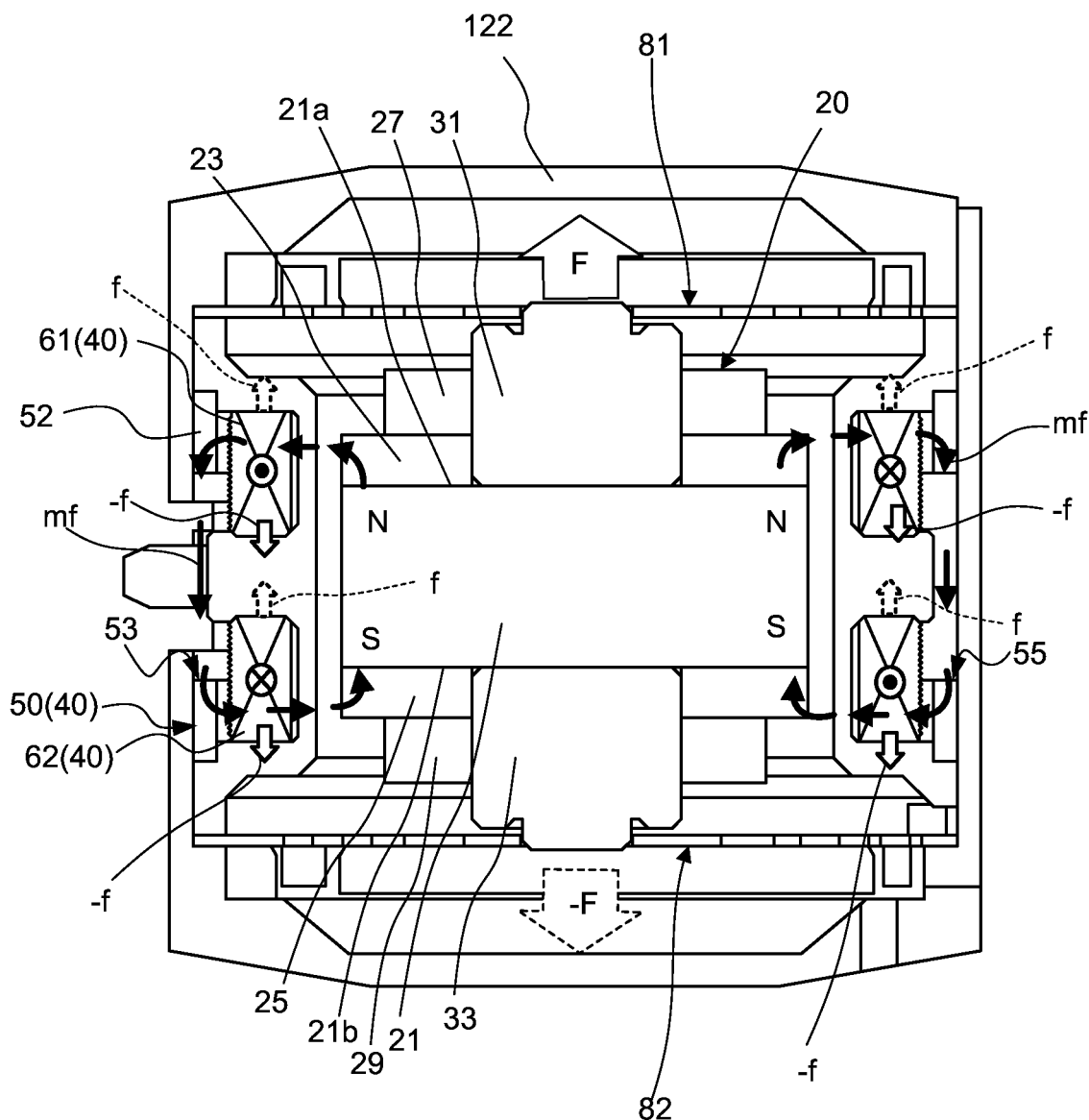
FIG. 14 is a diagram schematically illustrating a magnetic circuit of the vibration actuator.
Figure 15:
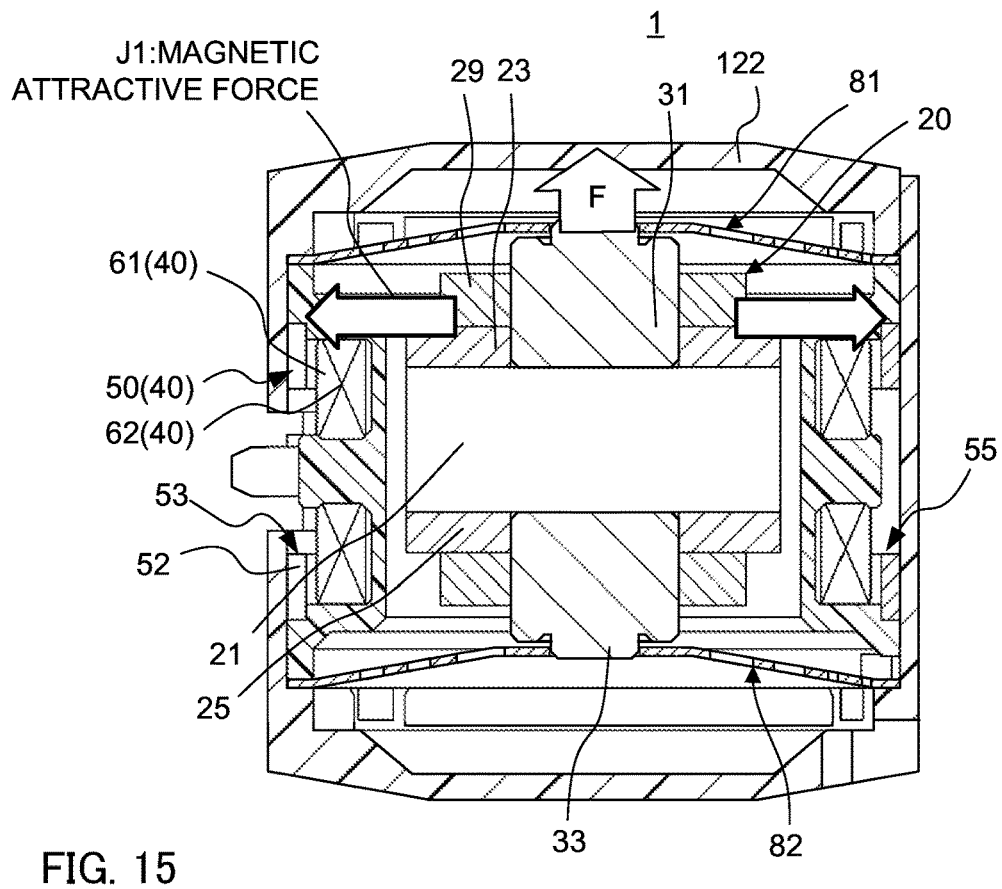
FIG. 15 is a diagram illustrating an operation of an actuator main body, and a diagram illustrating a vibration state where a movable body is located on a first amplitude position on the top surface side.
Figure 16:
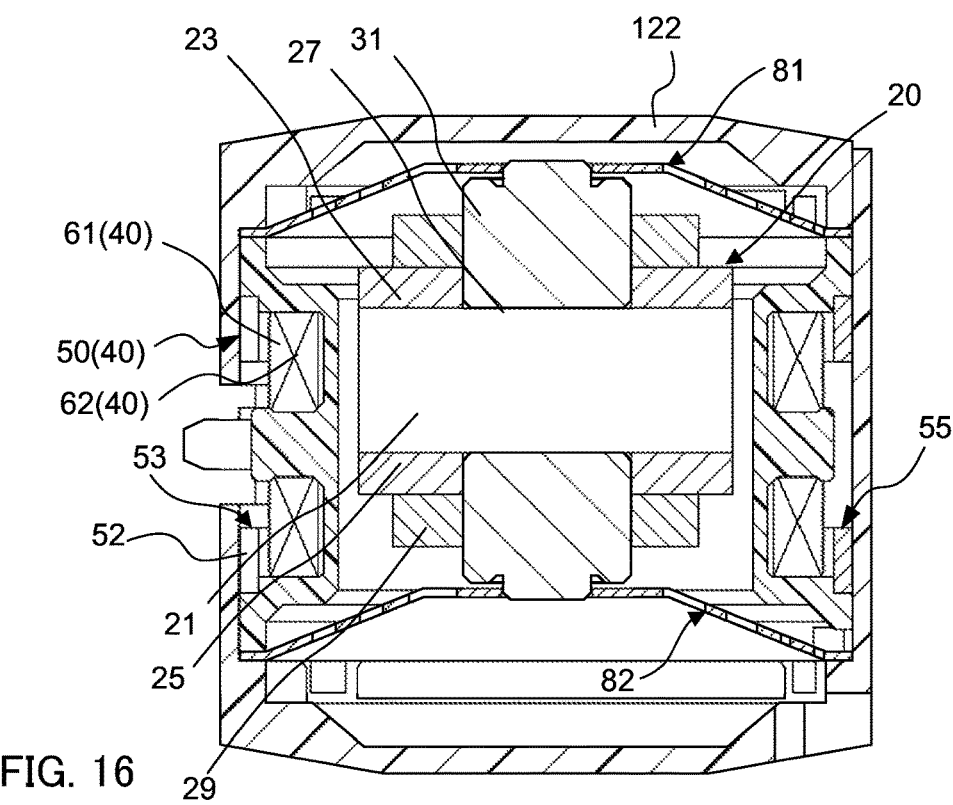
FIG. 16 is a diagram illustrating an operation of the actuator main body, and a diagram illustrating the vibration state where the movable body is located at a second amplitude position on the top surface side.
Figure 17:
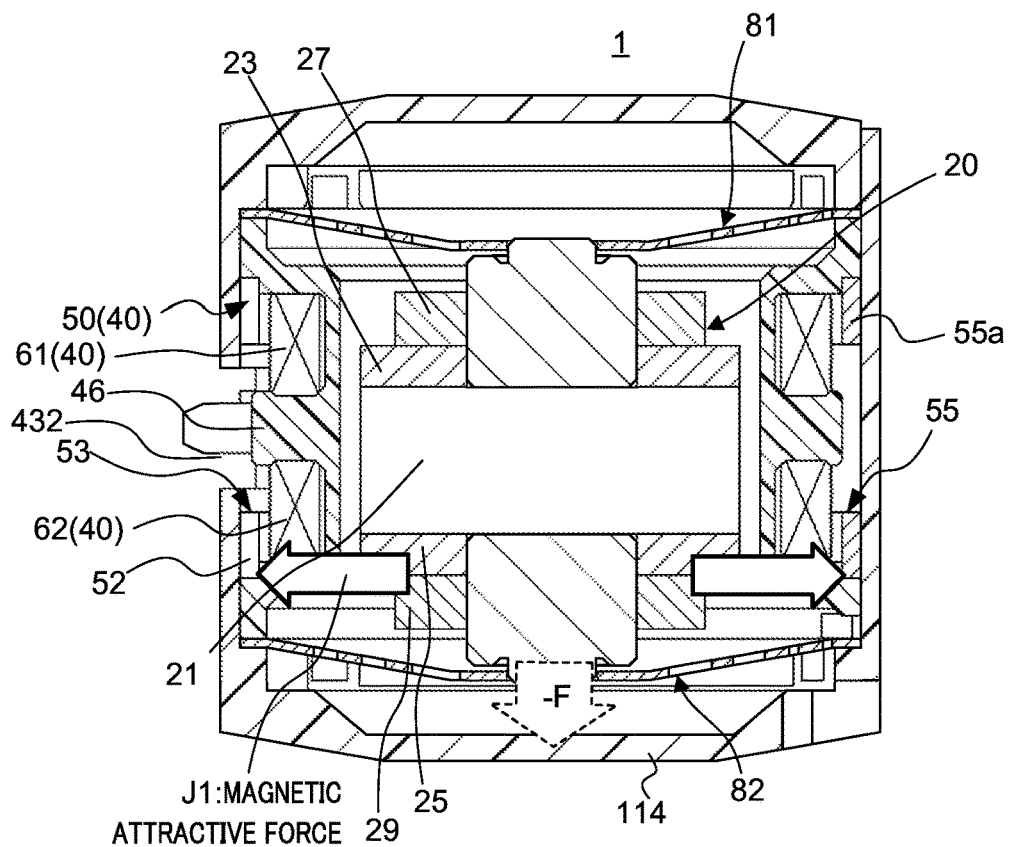
FIG. 17 is a diagram illustrating an operation of the actuator main body, and a diagram illustrating the vibration state where the movable body is located at the first amplitude position on the bottom surface side.
Figure 18:
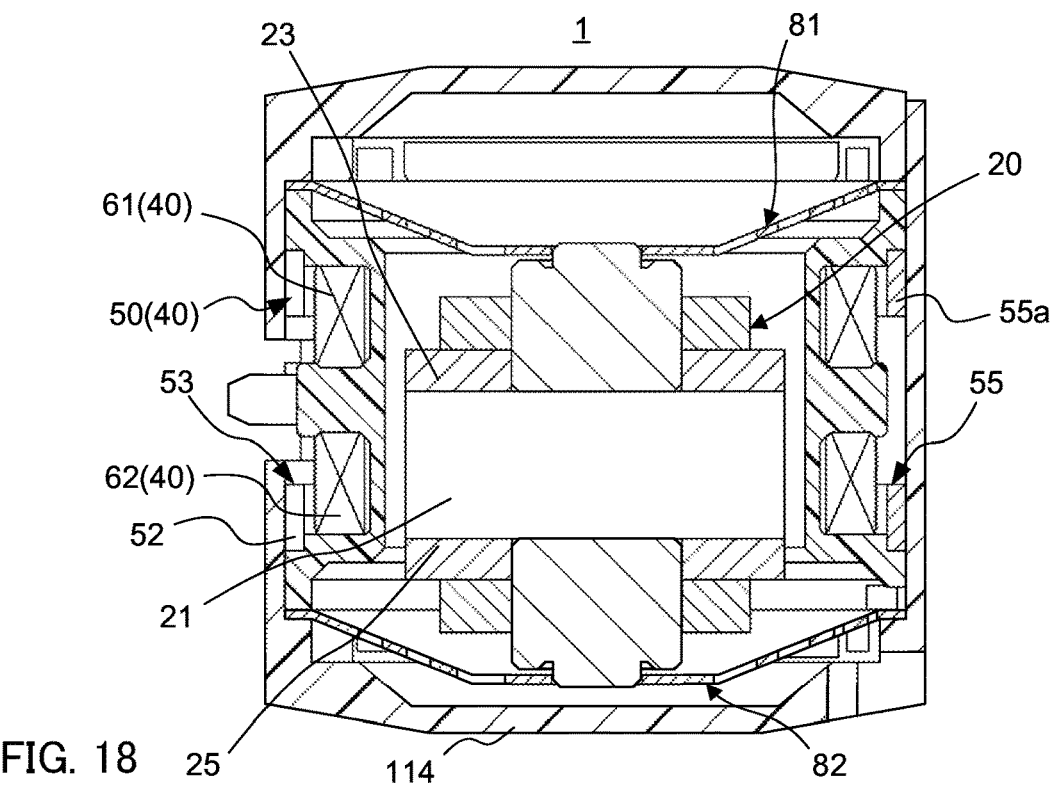
FIG. 18 is a diagram illustrating an operation of the actuator main body, and a vibration state where the movable body is located at the second amplitude position on the bottom surface side.

With reference to FIG. 14 to FIG. 18, an operation of a magnetic circuit of vibration actuator 1 is described below. FIG. 14 is a diagram schematically illustrating a magnetic circuit of the vibration actuator. FIG. 15 to FIG. 18 are diagrams illustrating an operation of the actuator main body, FIG. 15 is a diagram illustrating a vibration state where the movable body is located on the first amplitude position on the top surface side, and FIG. 16 is a diagram illustrating a vibration state where the movable body is located at the second amplitude position on the top surface side. In addition, FIG. 17 is a diagram illustrating the vibration state where the movable body is located at the first amplitude position on the bottom surface side, and FIG. 18 is a diagram illustrating an operation of the actuator main body, and is a diagram illustrating a vibration state where the movable body is located at the second amplitude position on the bottom surface side. Note that the second amplitude position illustrated in FIG. 16 and FIG. 18 is the maximum amplitude position of the movable body in the vibration direction.

An operation of vibration actuator 1 is described with an example where magnet 21 is magnetized such that front surface 21*a* side as one side (in the present embodiment, the upper side) of the magnetization direction is N pole, and rear surface 21*b* side as the other side (in the present embodiment, the lower side) of the magnetization direction is S pole.

In vibration actuator 1, movable body 20 can be regarded as a mass part of in a vibration model of in a spring-mass system, and therefore when the resonance is sharp (when there is a sharp peak), the sharp peak is suppressed by attenuating the vibration. By attenuating the vibration, the resonance becomes not sharp, and the maximum amplitude value and the maximum movement amount of movable body 20 during the resonance do not vary, and thus, vibration with a suitable and stable maximum movement amount is output.

In vibration actuator 1, the pair of coils 61 and 62 are disposed such that the coil axis is orthogonal to the magnetic flux from first yoke 23 and second yoke 25 sandwiching magnet 21 in the vibration direction.

More specifically, magnetic flux flow mf emitted from front surface 21*a* side of magnet 21, transmitted from first yoke 23 to coil 61 side through outer yoke 50 and coil 62 so as to impinge on magnet 21 from second yoke 25 on the lower side of magnet 21 is formed.

Thus, when energization is performed as illustrated in FIG. 14, the Lorentz force of the –f direction is generated at the pair of coils 61 and 62 by the interaction of the magnetic field of magnet 21 and the current flowing through the coil (the pair of coils 61 and 62) in accordance with Fleming's left hand rule.

The Lorentz force of the –f direction is the direction orthogonal to the direction of the magnetic field and the direction of the current flowing through the coil (the pair of coils 61 and 62). The coil (the pair of coils 61 and 62) is fixed to fixing body 40 (coil holding part 42), and therefore a force opposite to the Lorentz force of the –f direction is generated as the thrust of the F direction at movable body 20 including magnet 21 in accordance with the action-reaction law. In this manner, movable body 20 side including magnet 21 moves to the F direction, i.e., lid part 12 (top surface part 122 of lid part 12) side (see FIG. 15 and FIG. 16).

In addition, when the energization direction of the pair of coils 61 and 62 is switched to the opposite direction and the pair of coils 61 and 62 is energized, the Lorentz force of the opposite f direction is generated (see FIG. 14). Due to the generation of the Lorentz force of the f direction, a force opposite to the Lorentz force of the f direction is generated as a thrust (the thrust of the –F direction) at movable body 20 in accordance with the action-reaction law, and movable body 20 moves to the –F direction, i.e., bottom part 114 side of case main body 11 (see FIG. 17 and FIG. 18).

In vibration actuator 1, in a non-energized and in a non-vibration state, a magnetic attractive force acts between magnet 21 and outer yoke 50 and functions as a magnetism spring. With the magnetic attractive force generated between magnet 21 and outer yoke 50 and the restoration force of restoring the original shape of elastic support parts 81 and 82, movable body 20 is returned to the original position.

Effect

Figure 19:
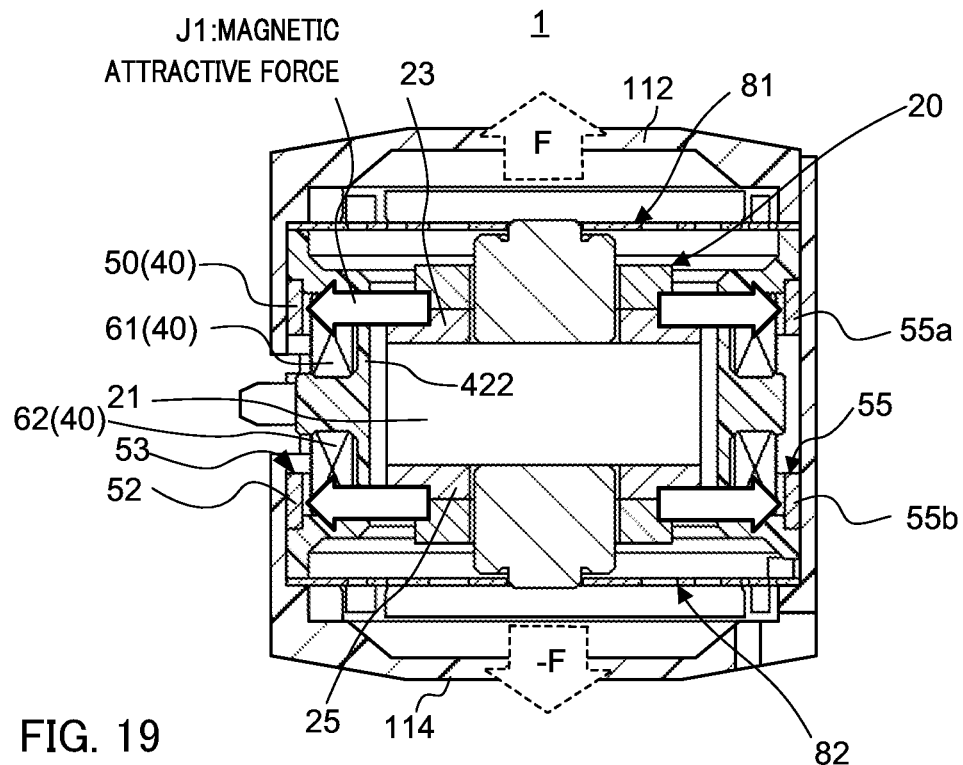
FIG. 19 is a diagram schematically illustrating a magnetism balance of the vibration actuator in a non-vibration state of the present embodiment.

FIG. 19 is a diagram schematically illustrating a magnetism balance of the vibration actuator in a non-vibration state of the present embodiment. Vibration actuator 1 includes fixing body 40 including the pair of coils 61 and 62, and movable body 20 disposed on the inside in the radial direction of the pair of coils 61 and 62 and including magnet 21 magnetized in axis direction of the pair of coils 61 and 62. Additionally, vibration actuator 1 includes plate-shaped elastic support parts 81 and 82 that elastically holds movable body 20 such that it is movable in the vibration direction as the coil axial direction.

The pair of coils 61 and 62 is disposed at the outer periphery of cylindrical main body part 422 of coil holding part 42, and outer peripheral surface 20*a* of movable body 20 is disposed on the inner periphery side of cylindrical main body part 422 with a predetermined distance therebetween. The outer peripheral surfaces of the pair of coils 61 and 62 are surrounded by outer yoke 50. Elastic support parts 81 and 82 support movable body 20 such that it does not makes contact with cylindrical main body part 422. Together with magnet 21, first yoke 23, second yoke 25 and coils 61 and 62, outer yoke 50 forms a magnetic path.

Here, outer yoke 50 includes the plurality of openings 53 and 55 dispersed in the circumferential direction at the same position in the vibration direction. Openings 53 and 55 are formed to keep balance of the magnetic path configured together with magnet 21 and coils 61 and 62 in the circumferential direction.

With this configuration, in vibration actuator 1, during the non-driving illustrated in FIG. 19, movable body 20 including magnet 21 is equally attracted in left and right upper and lower directions with respect to fixing body 40 including outer yoke 50 provided with the plurality of openings 53 and 55 through generation of magnetic attractive force J1. That is, with outer yoke 50 and magnet 21 functioning as magnetism spring, movable body 20 is disposed in a balanced state with respect to fixing body 40.

Then, when moving in one direction (F direction) of the vibration direction within the height of outer yoke 50 (the length range of the vibration direction), movable body 20 is equally attracted in the left and right directions on the upper side with left and right magnetic attractive force J1 on the upper side of movable body 20 as illustrated in FIG. 15. In this manner, in the vibration state where movable body 20 is located at the first amplitude position on the top surface side as the vibration state within the height range up to the upper end of outer yoke 50, movable body 20 moves straight in one direction of the vibration direction, here, the F direction.

Next, movable body 20 is set to a state where it is further moved to one direction (F direction) and protruded from outer yoke 50, i.e., a state where it is moved to a position where one end portion of movable body 20 protrudes from outer yoke 50 as illustrated in FIG. 16.

When this state is the vibration state where movable body 20 is located at the second amplitude position on the top surface side, i.e., the maximum amplitude position on the top surface side, the magnetic attractive force is not generated at the left and right ends of movable body 20 on the upper and lower sides. In this manner, the vibration state where it is located on the second amplitude position on the top surface side, movable body 20 and fixing body 40 do not attract each other, and the left and right magnetism balance of movable body 20 is ensured. The movement of movable body 20 in this state is straight movement in the vibration direction.

On the other hand, when the energization direction of coils 61 and 62 becomes opposite, it moves within the height of outer yoke 50 (the length range in the vibration direction) in the other direction (–F direction) of the vibration direction. In this case, as illustrated in FIG. 17, movable body 20 is equally attracted in the left and right directions on the lower side with left and right magnetic attractive force J1 on the lower side of movable body 20.

In this manner, in the vibration state where movable body 20 is located at the first amplitude position on the bottom surface side as the vibration state within the vibration range to the lower end of outer yoke 50, movable body 20 moves straight in the other direction of the vibration direction, here, the –F direction.

Next, movable body 20 further moves to the other direction (–F direction), and the state where it is protruded from outer yoke 50, i.e., the state where it is moved to the position where the other end portion of movable body 20 is protruded from outer yoke 50 as illustrated in FIG. 18. When this state is set as the vibration state where movable body 20 is located at the second amplitude position on the bottom surface side, i.e., the bottom surface side maximum amplitude position, the magnetic attractive force is not generated at the left and right ends on the upper and lower sides of movable body 20.

In this manner, in the vibration state where movable body 20 is located at the second amplitude position on the bottom surface side, movable body 20 and fixing body 40 do not attract each other, and the left and right magnetism balance of movable body 20 is ensured. The vibration of movable body 20 in this state is straight movement in the vibration direction.

In this manner, in vibration actuator 1, regardless of the position of movable body 20 displaced due to the vibration, i.e., the vibration state of the first and second amplitude positions on the top surface side or first and the vibration state of second amplitude positions on the bottom surface side, vibration is favorably made with a good magnetism balance. The magnetism balance is achieved with outer yoke 50 including the plurality of openings 53 and 55 dispersed in the circumferential direction at the same position in the vibration direction, such that the magnetic path configured together with magnet 21 and coils 61 and 62 is balanced in the circumferential direction.

Figure 20:
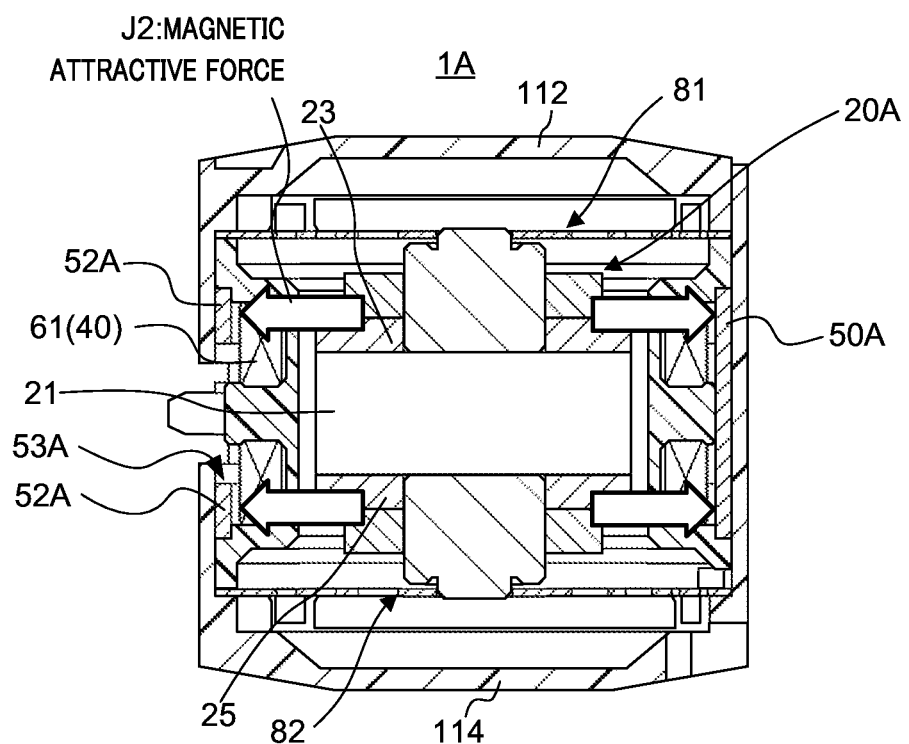
FIG. 20 is a diagram illustrating a magnetism balance in a non-vibration state of a vibration actuator as a comparative example.
Figure 21A:
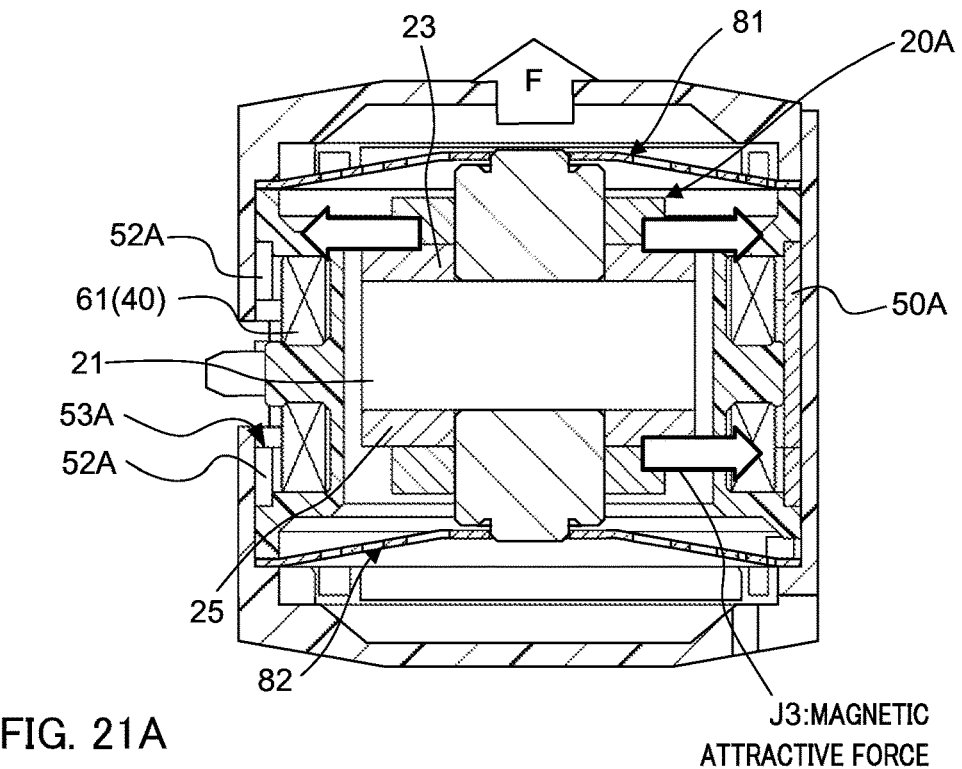
FIG. 21A and FIG. 21B are diagrams illustrating an operation of a vibration actuator as a comparative example.
Figure 21B:
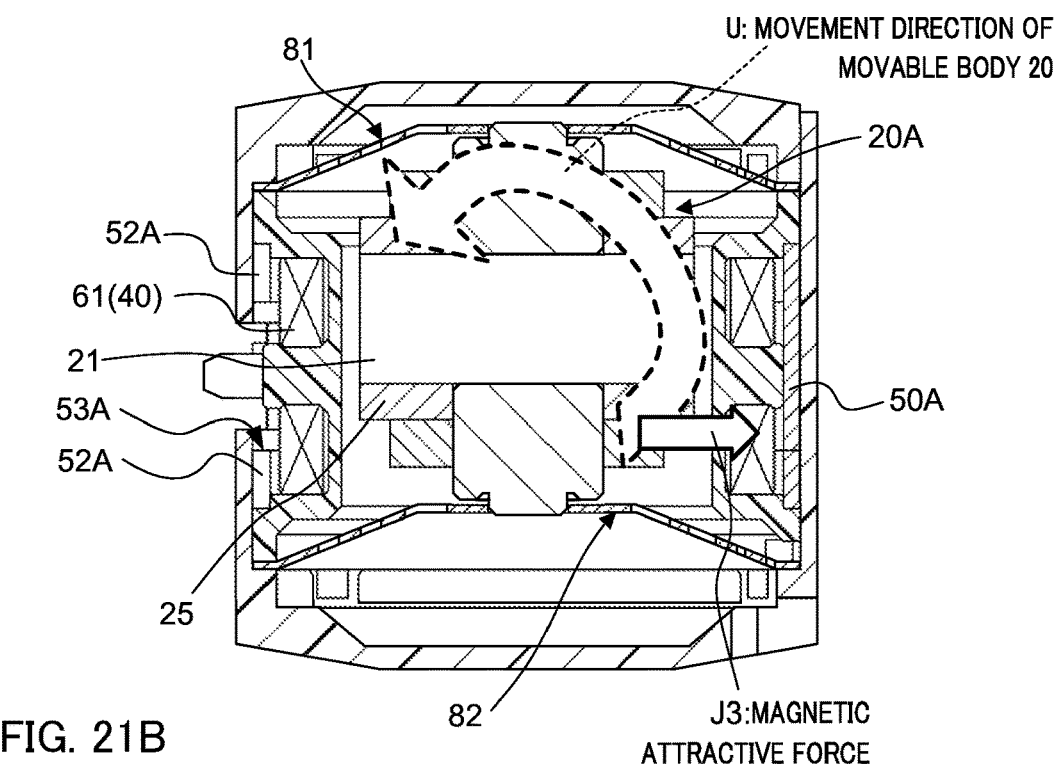

Here, with the comparative examples illustrated in FIG. 20 and FIG. 21, effects of the present embodiment are described in more detail. FIG. 20 is a diagram illustrating a magnetism balance in a non-vibration state of the vibration actuator of the comparative example of the case where one opening is provided in the outer yoke. FIG. 21A and FIG. 21B are diagrams illustrating an operation of a vibration actuator as a comparative example, FIG. 21A is a diagram illustrating a vibration state where the movable body is located on the first amplitude position on the top surface side, and FIG. 21B is a diagram illustrating a vibration state where the movable body is located at the second amplitude position on the top surface side.

Vibration actuator 1A illustrated in FIG. 20 is a vibration actuator as a comparative example that is different from vibration actuator 1 of the embodiment only in the configuration of outer yoke 50A. That is, in vibration actuator 1A illustrated in FIG. 20 and FIG. 21, outer yoke 50A includes only opening 53, and does not include other openings 55 unlike outer yoke 50 of vibration actuator 1.

As with vibration actuator 1, in vibration actuator 1A, magnetic attractive force J2 is generated at the left right end parts on the upper and lower sides of movable body 20A during the non-driving as illustrated in FIG. 20. That is, magnetic attractive force J2 is generated between fixing body 40A and the radial end portions (the upper and lower left and right end portions) of the both end portions separated in the vibration direction.

In this manner, during the non-driving of vibration actuator 1A, movable body 20A is equally attracted to fixing body 40A side in the upper and lower directions on the left and right sides, and movable body 20A is located in the state where the magnetism is balanced with respect to fixing body 40A.

In vibration actuator 1A having the above-mentioned configuration, the magnetism balance is changed when the movable body is vibrated in comparison with the vibration actuator 1 of the present embodiment.

In vibration actuator 1A, when movable body 20A moves in one direction (F direction) of the vibration direction, it is set to the vibration state where it moves within the height of outer yoke 50A (the length range of the vibration direction) as illustrated in FIG. 21A. This state is the state where movable body 20A is located at the first amplitude position on the top surface side, and left and right magnetic attractive force J2 is generated on the upper side of movable body 20A and equally attracted to each other.

On the other hand, on the lower side of movable body 20A, right side magnetic attractive force J3 is generated on the lower side of movable body 20A since outer yoke 50A includes only opening 53 (left side opening in FIG. 21). On the lower side of movable body 20A, left and right magnetism balances are different from each other as illustrated in FIG. 21A. For example, the magnetic attractive force on the side (in the drawing, left side) on which opening 53 is located with movable body 20 at the center is ½ of the magnetic attractive force on the side (in the drawing, the right side) on which the opening is not provided.

Next, movable body 20A further moves to one direction (F direction) and protruded from outer yoke 50A, i.e., it is moved to a position where one end portion of movable body 20A is protruded from outer yoke 50A of movable body 20A. As illustrated in FIG. 21B, this state is a state where it is located at the second amplitude on the top surface part side, and magnetic attractive force J3 is generated only at the lower right portion of movable body 20A, and movable body 20A is attracted to fixing body 40A only at that portion.

In this manner, a force of rotating in the arrow U is generated at movable body 20A, and movable body 20 cannot be vibrated straight in the vibration direction.

In this manner, in the vibration actuator 1 of the present embodiment, a good magnetism balance can be achieved regardless of the position of movable body 20 displaced due to the vibration in comparison with vibration actuator 1A. Thus, suitable vibration output can be generated while achieving the downsizing Further, vibration actuator 1 has the structure in which drive unit 15 is housed in case 10, and thus the outer peripheral surface of peripheral wall part 112 of case 10 can be smoothed. In this manner, when attaching vibration actuator 1 to an electric apparatus, it is possible to increase the joining state and the joining strength of a member, such as a double-sided tape, used for bonding a buffer member such as sponge to be interposed between it and an attaching portion to the outer peripheral surface.

In addition, since ventilation hole 116 is provided in the case, the air having nowhere to go during the vibration of movable body 20 in case 10 can be discharged to the outside, and the vibration itself of movable body 20 can be prevented from being attenuated. In addition, entry of foreign matters can be prevented, and suitable sensory vibration can be generated with high output.

Since the pair of coils 61 and 62 is disposed at the outer peripheral surface of coil holding part 42, it is not necessary to pull out the end portion of the winding coil line to the outside for connection to the external device at the time of assembly in comparison with the case where it is disposed at the inner peripheral surface of coil holding part 42.

In addition, since vibration actuator 1 is configured with drive unit 15 disposed in case 10, elastic support parts 81 and 82 that require high dimensional accuracy can be fixed through assembling to coil holding part 42.

That is, drive unit 15 is formed by housing movable body 20 in coil holding part 42 and assembling elastic support parts 81 and 82. In this manner, the installation of movable body 20, which includes fixation of elastic support parts 81 and 82, can be determined with coil holding part 42 as a reference, and the accuracy of the direction of the vibration generated as a product can be increased.

Specifically, for example, by only increasing the dimensional accuracy of coil holding part 42 formed as one component using resin or the like, coils 61 and 62 and magnet 21 of movable body 20 attached through elastic support parts 81 and 82 can be disposed in a precise positional relationship. That is, vibration actuator 1 that stably vibrates can be easily manufactured.

In addition, case 10 is formed in a bottomed cylindrical shape, i.e., formed with cup-shaped case main body 11 and lid part 12. In this manner, in comparison with a configuration in which peripheral wall part 112 and bottom part 114 are separately provided, the number of components can be reduced, assemblability can be improved, and impact resistance can be improved.

When lid part 12 is fit to opening 115 of cup-shaped case main body 11, fitting protrusion 126 is fit between fitting protrusions 126 separated in the circumferential direction in the state where the arc slit is formed with respect to inside opening 115. Through welding to fill the arc slit, filling the arc slit with bonding material and the like, they can be fixed without providing a protrusion at the outer peripheral surface of case 10.

Vibration actuator 1 is driven by alternating current waves input from the power supply part (for example, drive control part 203 illustrated in FIG. 22 and FIG. 23) to the pair of coils 61 and 62. That is, the energization direction of the pair of coils 61 and 62 is periodically switched, and the thrust in the F direction on top surface part 122 side of lid part 12 and the thrust of the −F direction on bottom part 114 side alternately act on movable body 20 as illustrated in FIG. 14. In this manner, movable body 20 vibrates in the vibration direction.

In the following, the driving principle of vibration actuator 1 is briefly described. In the vibration actuator 1 of the present embodiment, movable body 20 vibrates with respect to fixing body 40 at resonance frequency $F_r$ [Hz] calculated by Equation 1, where m [kg] is the mass of movable body 20, and $K_{sp}$ is the spring constant of the spring (elastic support parts 81 and 82 as springs).

(Equation 1)

$$F_r = \frac{1}{2\pi}\sqrt{\frac{K_{sp}}{m}} \quad [1]$$

Movable body 20 can be regarded as making up a mass part of in a vibration model of a spring-mass system, and as such movable body 20 is put in a resonance state when alternating current waves of a frequency equal to resonance frequency $F_r$ of movable body 20 is input to the coil (the pair of coils 61 and 62). That is, movable body 20 can be efficiently vibrated by inputting alternating current waves of a frequency substantially equal to resonance frequency $F_r$ of movable body 20 from the power supply part to the coil (the pair of coils 61 and 62).

An equation of motion and a circuit equation representing the driving principle of vibration actuator 1 are described below. Vibration actuator 1 is driven based on the equation of motion represented by Equation 2 and the circuit equation represented by Equation 3.

(Equation 2)

$$m\frac{d^2 x(t)}{dt^2} = K_f i(t) - K_{sp} x(t) - D\frac{dx(t)}{dt} \quad [2]$$

M: mass [kg]
X(t): displacement [m]
$K_f$: thrust constant [N/A]
I(t): current [A]
$K_{sp}$: spring constant [N/m]
D: attenuation coefficient [N/(m/s)

(Equation 3)

$$e(t) = Ri(t) + L\frac{di(t)}{dt} + K_e\frac{dx(t)}{dt} \quad [3]$$

E(t): voltage [V]
R: resistance [Ω]
L: inductance [H]
$K_e$: counterelectromotive force constant [V/(rad/s)]

That is, mass m [kg], displacement x(t) [m], thrust constant Kf [N/A], current i(t) [A], spring constant $K_{sp}$ [N/m], attenuation coefficient D [N/(m/s)] and the like in vibration actuator 1 can be appropriately changed as long as Equation 2 is satisfied. In addition, voltage e(t) [V], resistance R [Ω], inductance L [H], and counterelectromotive force constant $K_e$ [V/(rad/s)] can be appropriately changed as long as Equation 3 is satisfied.

In this manner, in vibration actuator 1, large vibration output can be efficiently obtained when coils 61 and 62 are energized with alternating current waves corresponding to resonance frequency $F_r$ determined by mass m of movable body 20 and spring constant $K_{sp}$ of elastic support parts 81 and 82 as leaf springs.

In addition, vibration actuator 1 is driven by the resonance phenomenon using the resonance frequency represented by Equation 1 and satisfying Equations 2 and 3. In this manner, vibration actuator 1 can be driven with low power consumption, i.e., movable body 20 can be vibrated straight with low power consumption. In addition, when attenuation coefficient D is increased, vibration can be generated over a higher bandwidth.

According to the present embodiment, plate-shaped elastic support parts 81 and 82 are disposed on the upper and lower (the vibration direction) sides of movable body 20. In this manner, vibration actuator 1 can stably drive movable body 20 in the vertical direction while efficiently distributing the magnetic flux of the pair of coils 61 and 62 from elastic support parts 81 and 82 on the upper and lower sides of magnet 21. In this manner, as vibration actuator 1, high output vibration can be achieved.

In addition, fixing body 40 includes coil holding part 42 that serves also as a protective function of the pair of coils 61 and 62 for movable body 20. In this manner, even in the case where fixing body 40 receives impacts, it can resist the impact, and damages such as deformation are not given to elastic support parts 81 and 82. In addition, the impact is transmitted to the pair of coils 61 and 62 through cylindrical main body part 422 made of resin, and thus damages can be suppressed, achieving highly reliable vibration actuator 1. In this manner, with vibration actuator 1, downsizing can be achieved in a cost-effective manner, and suitable sensory vibration can be generated with impact resistance and high output.

Electronic Apparatus

Figure 22:
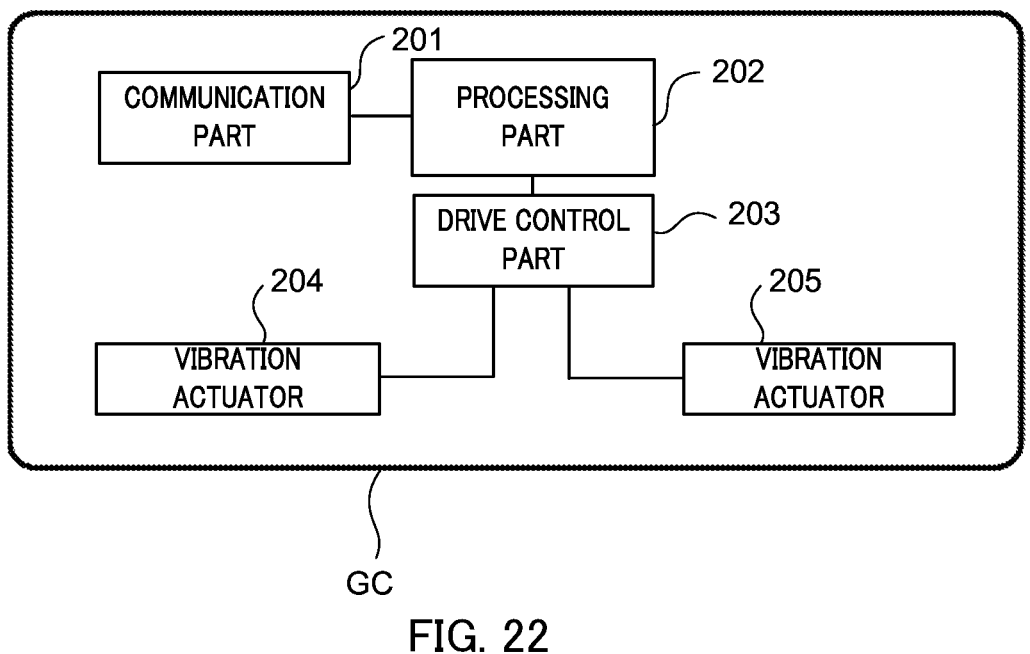
FIG. 22 is a diagram illustrating an example of an electric apparatus in which the vibration actuator of the present embodiment is mounted.
Figure 23:
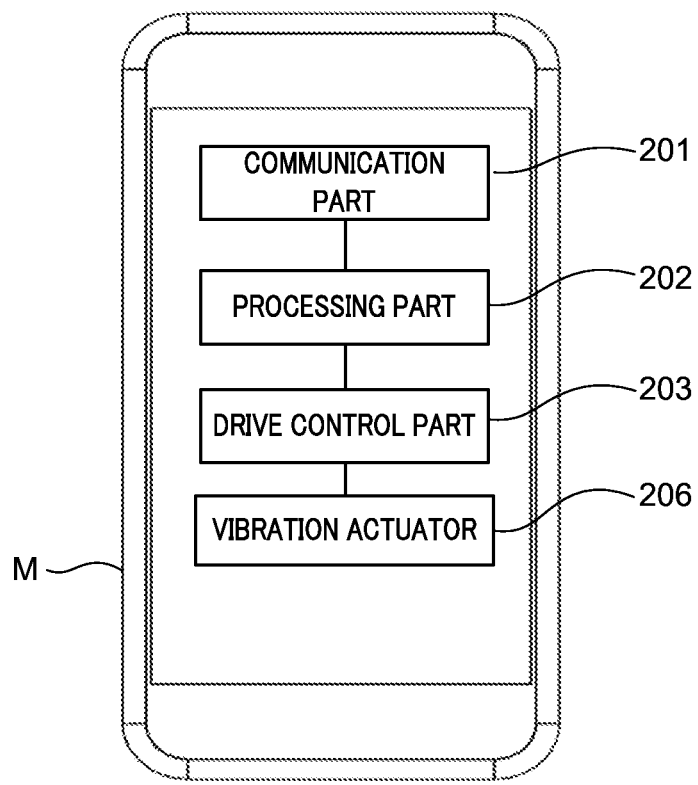
FIG. 23 is a diagram illustrating an example of an electric apparatus in which the vibration actuator of the present embodiment is mounted.

FIG. 22 and FIG. 23 are diagrams illustrating an example of mounting of vibration actuator 1. FIG. 22 illustrates an example in which vibration actuator 1 is mounted in game controller GC, and FIG. 23 illustrates an example in which vibration actuator 1 is mounted in mobile terminal M.

Game controller GC is connected to a game machine main body through wireless communications, and used by being grabbed by the user, for example. Here, game controller GC has a rectangular plate shape, and the user operates game controller GC by grabbing its left and right sides with both hands.

Game controller GC notifies the user of commands from game machine main body in the form of vibration. Note that although not illustrated in the drawings, game controller GC has functions other than command notification, such as an inputting operation part to the game machine main body.

Mobile terminal M is a mobile communication terminal such as a mobile phone and a smartphone, for example. Mobile terminal M notifies the user of incoming calls from external communication apparatus in the form of vibration, and achieves each function (such as a function of providing sense of operation and a function of providing realism) of mobile terminal M.

As illustrated in FIG. 22 and FIG. 23, each of game controller GC and mobile terminal M includes communication part 201, processing part 202, drive control part 203, and vibration actuators 204, 205 and 206 that are vibration actuator 1 as a driving part. Note that a plurality of vibration actuators 204 and 205 are mounted in game controller GC.

In game controller GC and mobile terminal M, it is preferable that vibration actuators 204 to 206 be disposed such that the main surface of the terminal and the surface orthogonal to the vibration direction of vibration actuators 204 to 206, here, the bottom surface of bottom part 114 are parallel to each other, for example.

The main surface of the terminal is a surface that makes contact with the body surface of the user, and, in the present embodiment, means a vibration transmission surface that makes contact with the body surface of the user and transmits vibration thereto. Note that the main surface of the terminal and the bottom surface of bottom part 114 of vibration actuators 204, 205 and 206 may be disposed to be orthogonal to each other.

More specifically, vibration actuators 204 and 205 are mounted in game controller GC such that the surface that makes contact with the fingertip, finger ball, palm and the like of the user operating it, or the surface where the operation part is provided, and the vibration direction are orthogonal to each other. In addition, in the case of mobile terminal M, vibration actuator 206 is mounted such that display screen (touch panel surface) and the vibration direction are orthogonal to each other. In this manner, the vibration in the direction perpendicular to game controller GC and the main surface of mobile terminal M is transmitted to the user.

Communication part 201, which is connected to the external communication apparatus through wireless communication, receives signals from the communication apparatus and outputs it to processing part 202. In the case of game controller GC, the external communication apparatus is a game machine main body as an information communication terminal, and performs communication in accordance with short-range wireless communication standard such as Bluetooth (registered trademark). In the case of mobile terminal M, the external communication apparatus is a base station, and performs communication in accordance with the moving body communication standard, for example.

Processing part 202 converts the input signal into a driving signal for driving vibration actuators 204, 205 and 206 with the conversion circuit part (omitted in the drawing), and outputs it to drive control part 203. Note that in mobile terminal M, processing part 202 generates driving signals on the basis of signals input from communication part 201, and signals input from various functional parts (e.g., an operation part such as a touch panel omitted in the drawing).

Drive control part 203 is connected to vibration actuators 204, 205 and 206, and the circuit for driving vibration actuators 204, 205 and 206 is mounted. Drive control part 203 supplies the driving signal to vibration actuators 204, 205 and 206.

Vibration actuators 204, 205 and 206 are driven in accordance with the driving signal from drive control part 203. More specifically, in vibration actuators 204, 205 and 206, movable body 20 vibrates in the direction orthogonal to the main surface of mobile terminal M and game controller GC.

Note that movable body 20 may make contact with bottom part 114 or top surface part 122 of lid part 12 with a damper therebetween each time it vibrates. In this case, in association with the vibration of movable body 20, the impact on bottom part 114 or top surface part 122 of lid part 12, i.e., the impact on the housing, is directly transmitted to the user as vibration.

The vibration in the direction perpendicular to the body surface is transmitted to the body surface of the user that makes contact with game controller GC or mobile terminal M, and thus sufficient sensory vibration can be given to the user. In game controller GC, the sensory vibration for the user can be given by using one or both of vibration actuators 204 and 205, and at least highly expressive vibrations such as selectively applying strong and weak vibrations can be provided.

The invention made by the present inventor has been described specifically based on the above embodiments. The invention is not limited to the above embodiments, but can be modified to the extent not to depart from the gist thereof.

In addition, the vibration actuator according to the present invention may be mounted in the part that makes contact with the user in mobile apparatuses other than the game controller GC and the mobile terminal M (for example, mobile information terminals such as tablet PC and mobile game terminals) and the like. Vibration actuator 1 may be mounted on the part in contact with the user in hand-carry electrical devices such as mobile terminals and electric beauty and beauty equipment such as facial massagers. Vibration actuator 1 may be mounted on a part in contact with the user in a wearable device) that is worn and used by the user. The part in contact with the user is, for example, a handle that the user grasps during use, in the case of a hand-carry electrical device such as a game controller GC, for example. In the case of a wearable electrical device, such as a facial massager, for example, the user-contacting part is, for example, a pressurizing part that applies pressure to the user's body surface.

INDUSTRIAL APPLICABILITY

The vibration actuator of the present invention can generate a suitable vibration output while maintaining a compact size, and is useful for use in electronic equipment such as game terminals or portable terminals, and electrical equipment such as electric beauty equipment.

REFERENCE SIGNS LIST 1, 204, 205, 206 Vibration actuator
10 Case
11 Case main body
12 Lid part
15 Drive unit
20 Movable body
20a Outer peripheral surface
21 Magnet
21a Front surface
21b Rear surface
23 First yoke
25 Second yoke
27, 29 Weight part
31, 33 Connecting part
40 Fixing body
41 Layout part
42 Coil holding part
42a Inner peripheral surface
42b, 42c Coil attaching portion
43 Terminal tying part
44, 45 Engaging protruding part
46 Terminal drawing part
47 Connecting groove part
50 Outer yoke
51 Yoke main body
52 End portion
53, 55 Opening
55a Upper portion
55b Lower portion
61, 62 Coil
63, 64 Winding
81, 82 Elastic support part
112 Peripheral wall part
113 Cutout part
114 Bottom part
114a, 122a Center portion
114b, 122b Recess
115 Opening
116 Ventilation hole
117 Engaging recess
118 Surface part
122 Top surface part
122b Recess
124 Downward part
126 Fitting protrusion
127 Engaging recess
128 Positioning surface part
201 Communication part
202 Processing part
203 Drive control part
232, 252 Yoke opening (Aperture)
272, 292 Through hole
312 Connection main body
313, 333 Spring fixing part
314 Support fixing part
332 Connection main body
334 Support fixing part
412 Coil guide part
420 Recessed part
422 Cylindrical main body part
426, 427, 428 Flange part
426a Outer periphery part
427a, 428a Opening edge surface
432 Fillet
533 Cutout part
802 Inner periphery part
802a Connection hole
804 Deformation arm
806 Outer periphery part
808 Positioning groove part

The invention claimed is:

1. A vibration actuator comprising:
a movable body including a magnet; and
a fixing body configured to house the movable body, and including a coil surrounding an outer periphery of the magnet and an outer yoke surrounding an outer periphery of the coil, the fixing body being configured to support the movable body so as to allow the movable body to vibrate back and forth in a vibration direction orthogonal to a radial direction of the coil, wherein
the outer yoke is a cylindrical body and includes a plurality of openings that keep a balance of a magnetic path configured together with the magnet and the coil in a circumferential direction of the outer yoke and that are provided at even intervals in the circumferential direction and at the same position in the vibration direction, the plurality of openings further being formed in a rectangular shape in a cylindrical portion of the cylindrical body, one of the openings being used as a wiring port for connecting an external device and the coil.

2. The vibration actuator according to claim 1, wherein a pair of the openings are symmetrically disposed in the radial direction.

3. The vibration actuator according to claim 1, wherein the opening, which is used as the wiring port, has a cut out on the vertical side in the vibration direction.

4. The vibration actuator according to claim 1, wherein both of the pair of openings are provided at a center portion of the outer yoke in the vibration direction.

5. The vibration actuator according to claim 1, wherein
the movable body includes a stacked member obtained by stacking the magnet and a yoke in the vibration direction, and
the outer yoke has a length that does not cover both end portions of a movable range of the stacked member in the vibration direction.

6. An electric apparatus that is a hand-carry electric apparatus or a wearable electric apparatus, wherein
the vibration actuator according to claim 1 is mounted in a contact part that can be in contact with a user.

7. The vibration actuator according to claim 1, wherein the outer yoke has a C-cylindrical shape in plan cross-sectional view.

* * * * *